(12) United States Patent
Niu et al.

(10) Patent No.: US 11,968,715 B2
(45) Date of Patent: Apr. 23, 2024

(54) METHODS OF CCA FOR FREQUENCIES BETWEEN 52.6 GHz AND 71 GHz

(71) Applicant: APPLE INC., Cupertino, CA (US)

(72) Inventors: Huaning Niu, Cupertino, CA (US); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Oghenekome Oteri, San Diego, CA (US); Sigen Ye, Cupertino, CA (US); Wei Zeng, Cupertino, CA (US); Weidong Yang, San Diego, CA (US); Yang Tang, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 311 days.

(21) Appl. No.: 17/593,536

(22) PCT Filed: Oct. 15, 2020

(86) PCT No.: PCT/CN2020/121279
§ 371 (c)(1),
(2) Date: Sep. 20, 2021

(87) PCT Pub. No.: WO2022/077380
PCT Pub. Date: Apr. 21, 2022

(65) Prior Publication Data
US 2022/0312482 A1 Sep. 29, 2022

(51) Int. Cl.
H04W 74/08 (2009.01)
H04W 16/28 (2009.01)
(Continued)

(52) U.S. Cl.
CPC ....... H04W 74/0816 (2013.01); H04W 16/28 (2013.01); H04W 56/001 (2013.01); H04W 74/0866 (2013.01)

(58) Field of Classification Search
CPC ............. H04W 74/0816; H04W 16/28; H04W 56/001; H04W 74/0866; H04W 72/23;
(Continued)

(56) References Cited

U.S. PATENT DOCUMENTS

| 2022/0053430 A1* | 2/2022 | Chande | ............... H04W 52/243 |
| 2022/0053562 A1* | 2/2022 | Chande | ............... H04W 74/006 |
| 2023/0164841 A1* | 5/2023 | Talarico | ............. H04L 27/0006 370/329 |

OTHER PUBLICATIONS www.techplayon.com, "5G NR Total Transmit Power I Maximum Cell Transmit Power I Reference Signal Power", https://www.techplayon.com/5g-nr-total-transmit-power-maximum-cell-transmit-power-reference-signal-power/, Jul. 6, 2019, 7 pages.

(Continued)

Primary Examiner — Eric Myers
(74) Attorney, Agent, or Firm — Dorsey & Whitney LLP

(57) ABSTRACT

Systems and methods for using clear channel assessment (CCA) on a channel prior to transmitting the channel are disclosed. A wireless transmission system may perform omnidirectional CCA using a CCA power threshold that is calculated based on a number of synchronization signal blocks (SSBs) transmitted by the wireless transmission system per SSB burst or per synchronization signal/physical broadcast channel (SS/PBCH) block measurement timing configuration (SMTC) window, or on a number of transmit (Tx) antennas used. A wireless transmission system may perform directional CCA on one or more Rx beams that correspond to one or more intended Tx beams using CCA power thresholds calculated based on an equivalent isotropic radiated power (EIRP) of the one or more intended Tx (Continued)

beams to determine directional availability of the channel. A wireless transmission system may determine a CCA power threshold based on a scaling between an actual CCA bandwidth and a nominal CCA bandwidth.

18 Claims, 18 Drawing Sheets

(51) Int. Cl.
　　*H04W 56/00*　　　(2009.01)
　　*H04W 74/0816*　　(2024.01)

(58) Field of Classification Search
　　CPC . H04W 74/0808; H04W 24/08; H04W 56/00; H04W 72/1263; H04W 72/535; H04B 7/06952
　　See application file for complete search history.

(56) References Cited

OTHER PUBLICATIONS

Apple Inc., "On Channel Access Mechanisms for Unlicensed Access above 52.6 GHz", R1-2006513, 3GPP TSG RAN WG1 #102-e, Agenda Item 8.2.2, Aug. 17-28, 2020, 8 pages.
Futurewei, "Considerations on directional LBT and spatial reuse", R1-2005282, 3GPP TSG RAN WG1 Meeting #102-e, Agenda Item 8.2.2, Aug. 17-28, 2020, 3 pages.
Qualcomm Incorporated, "FL summary for channel access mechanism for 52.6GHz-71GHz band", R1-2006994, 3GPP TSG RAN WG1 Meeting #102-e, Agenda Item 8.2.2, Aug. 17-24, 2020, 13 pages.
NTT DOCOMO, Inc., "Channel Access Mechanism for NR in 60 GHz unlicensed spectrum", R1-2006726, 3GPP TSG RAN WG1 #102, Agenda Item 8.2.2, Aug. 17-28, 2020, 4 pages.
WIPO, International Search Report and Written Opinion, PCT/CN2020/121279, dated Jul. 15, 2021, 9 pages.

\* cited by examiner

METHODS OF CCA FOR FREQUENCIES BETWEEN 52.6 GHz AND 71 GHz

TECHNICAL FIELD

This application relates generally to wireless communication systems, including the use of clear channel assessment (CCA) methods with such wireless communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Frequencies outside of traditional NR frequencies (e.g., outside of FR1 and FR2) may be of interest to implementers of NR equipment. For example, frequencies between 52.6 GHz and 71 GHz may be of interest due to their proximity to 52.6 GHz (the FR2 upper bound) and/or because of the unlicensed nature of at least some of this spectrum (e.g., between 57 GHz and 71 GHz). These (or other) frequencies may be used to establish/host one or more channels (e.g., a bandwidth which can be used for signaling between devices) according to the transmission abilities of a wireless transmission system.

Accordingly, a channel access mechanism for accessing/ establishing channels this (or another) range of frequencies outside of FR1 and FR2 may be defined to allow implementers of NR equipment to configure their NR devices to use channels within this (or another) range of frequencies. For example, a channel access mechanism may be used to control access to, for example, a channel that is in the 52.6 GHz to 71 GHz range (or another range). This channel access mechanism may be configured to comply with regulatory requirements applicable to any unlicensed spectrum within this frequency range.

Further, it is anticipated that in NR systems, in many cases, a transmission may use multiple transmit (Tx) antennas. This multiple antenna use may impose changes on a power of the signal (e.g., there may be signal gains through the use of the multiple antennas as compared to the nominal transmit power used at the wireless transmission system)

and/or on the spatial characteristics of the signal (e.g., a beamforming direction may be imposed upon transmissions within the channel due to the multiple antenna use). Accordingly, embodiments herein discuss systems and methods for channel access mechanisms that take into account these changed characteristics, in order to make more efficient use of the channel. In other words, channel access mechanisms in the context of multiple Tx antennas can be improved through systems and methods that account for the multiple Tx antenna use.

Figure 1:
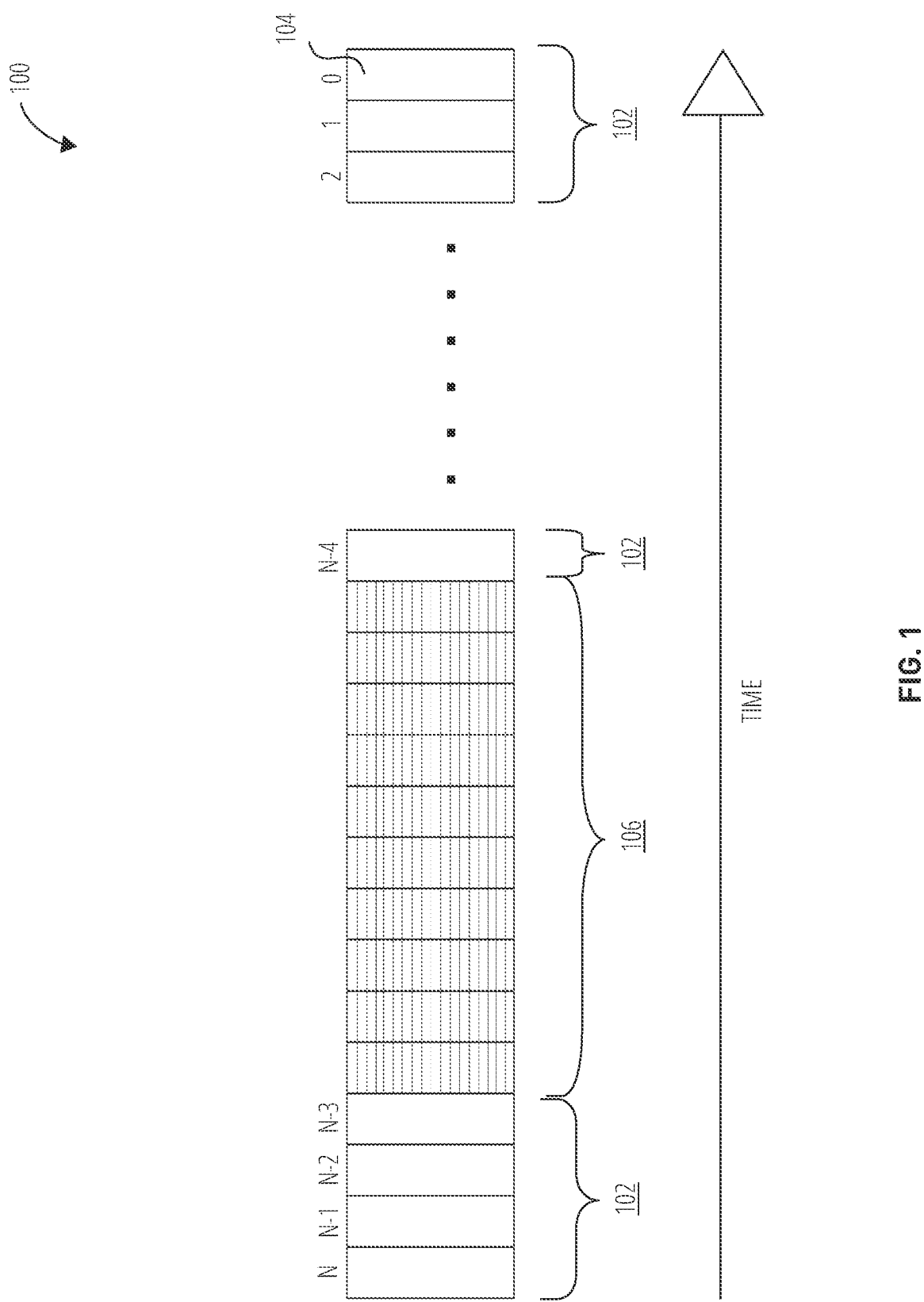
FIG. 1 illustrates the operation of a clear channel assessment (CCA) of a channel access mechanism, according to some embodiments.

FIG. 1 illustrates the operation of a clear channel assessment (CCA) 100 of a channel access mechanism, according to some embodiments. The channel access mechanism may be, for example, a listen before talk (LBT) mechanism that is used by a wireless transmission system that wants to acquire (e.g., transmit on, and/or instruct/allow other devices to transmit on) the channel. The channel access mechanism may use the CCA 100 on the channel to determine whether to allow the wireless transmission system to access the channel. As used herein, "wireless transmission system" means any device or system that is capable of transmitting on the channel, and may include any device that can use a channel access mechanism with a CCA precedent to such a transmission. Examples of such "wireless transmission systems" include base stations, UEs, etc.

The wireless transmission system performing the CCA senses the channel to determine whether the channel is occupied. First, the device performing the CCA senses energy level in the channel and compares it to a CCA power threshold. If the energy level in the channel is above the CCA power threshold, the channel is presumed to be occupied. If the energy level in the channel is below the CCA power threshold, the CCA continues to sense the channel for a number of slots. For example, the CCA may first sense the channel for an initial duration, which may be 8 µs. If the energy level in the channel remains below that level during this initial duration, the CCA process may proceed to defer its transmission in the channel for a random number of slots (which may be of a slot duration that is different than the initial duration, for example, a 5 µs slot durations) which are below the CCA power threshold. The time period corresponding to an initial duration plus the one or more slot durations used after the initial duration is referred to herein as a CCA time. When the energy detected during any of these slots during the CCA is above the CCA power threshold, the CCA does not count that slot as part of the CCA time, but continues to sense the channel and count any subsequent slots during the CCA that do not have energies that are above the CCA power threshold. Once the random number of additional slots have been sensed to have energies be below the CCA power threshold (e.g., once the channel has been sensed to have energy below the CCA power threshold for a total amount of time equaling the CCA time) the CCA time is deemed to have passed. Note that in some embodiments (e.g., as described below), a single CCA may use multiple CCA times. Once the CCA time (or CCA times, in embodiments where the CCA uses multiple CCA times) corresponding to the CCA has passed, the channel is deemed to be unoccupied. Accordingly, the wireless transmission system then acquires (e.g., transmits on, and/or instructs and/or allows other devices to transmit on) the channel for up to a maximum channel occupancy time (COT). In some instances, the maximum COT may be, for example, 5 ms.

For example, a wireless transmission system implementing a channel access mechanism that uses the CCA 100 may determine that a channel is unoccupied for an initial duration (e.g., 8 µs) by comparing the energy detected in the channel to a CCA power threshold. The device may then begin counting a random number of slots (N slots 102) and may transmit after N slots 102 have passed (after slot 0 104 of the N slots 102). As illustrated, the CCA 100 deferred its count of N slots 102 for the duration of the used slots 106. This is because the energy in the channel during the used slots 106 was higher than the CCA power threshold.

The device may use one or more formulas to determine the CCA power threshold that should be used during a CCA. These formulas may incorporate and/or use values that are predetermined. For example, these formulas may use values that are set by an interoperability standard. This may help ensure compatibility/appropriate thresholding within the environment defined by the standard. For example, some CCA power threshold formulas for use in NR may make use of a transmit power upper limit applicable to (one or more) wireless transmission systems according to NR.

The one or more formulas may take into account one or more aspects of the wireless transmission system performing a CCA. Such formulas may be tailored such that the channel can be fairly shared as between wireless transmission systems with weaker transmission powers and wireless transmission systems with stronger transmission powers. For example, a wireless transmission system with a relatively stronger transmission power (e.g., a base station) may, generally speaking, through the use of the formula, calculate a CCA power threshold that is lower than a CCA power threshold calculated by a wireless transmission system with a relatively weaker transmission power (e.g., a UE) that uses the same formula. Accordingly, all else equal, wireless transmission systems with relatively weaker transmission powers have a relatively increased likelihood of passing the CCA, and therefore the channel will not necessarily always be taken by wireless transmission systems with larger transmission powers (which could otherwise crowd out the wireless transmission systems of smaller transmission powers over time as a result of the larger spatial effect of their larger transmission powers). The higher CCA power threshold for wireless transmission systems with weaker transmission powers may also be appropriate because these wireless transmission systems do not require as much of the channel, spatially speaking, when transmitting as compared to wireless transmission systems with stronger transmission powers; thus relatively more frequent transmissions from these wireless transmission systems will not have the same spatial costs as a similar transmission rate from more powerful wireless transmission systems.

For example, the equivalent isotropic radiated power (EIRP) for the transmission that a wireless transmission system wishes to perform in the channel may be known or estimated prior to the performance of the CCA. A formula may account for the EIRP by providing wireless transmission systems using higher EIRPs a lower CCA power threshold, which may make them comparatively less likely to pass the CCA.

As discussed above, it is anticipated that in NR systems, in many cases, a wireless transmission system may use multiple Tx antennas to transmit a signal. This multiple Tx antenna use may impose changes on EIRP of the transmitted signal (e.g., there may be signal gains through the use of the multiple antennas as compared to the nominal transmit power used at the wireless transmission system) and/or on the spatial characteristics of the signal (e.g., beamforming direction). Accordingly, embodiments herein discuss systems and methods (including formulas) for channel access mechanisms that take into account these changed EIRPs and/or the changed spatial characteristics, in order to make more efficient use of the channel via a CCA mechanism.

For purposes of this disclosure, "omnidirectional CCA" means that the sensing during the CCA corresponds to the areas sensed by a single antenna of a wireless transmission system, and as such the sensing area does not correspond to any form of explicit beamforming. It is noted that in some cases, a wireless transmission system that is a base station can be sector based. For purposes of this disclosure, the use of a sensing area corresponding to a (sector-associated) area sensed by a single antenna of the base station is considered an "omnidirectional CCA."

Various examples illustrating wireless transmission systems performing an omnidirectional CCA using a calculated CCA power threshold follow.

Figure 2:
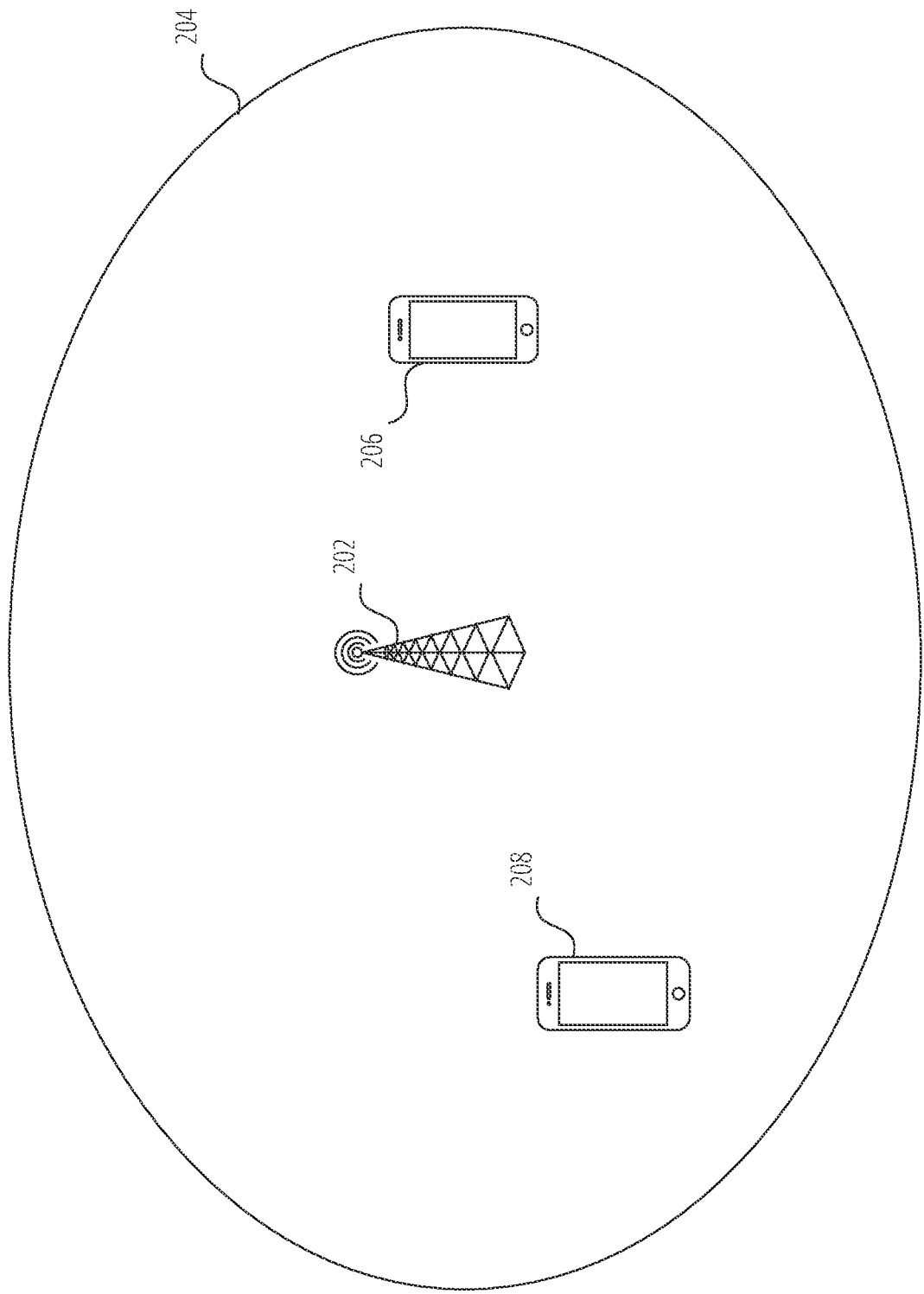
FIG. 2 illustrates a base station that can perform an omnidirectional CCA, according to an embodiment.

FIG. 2 illustrates a base station 202 that can perform an omnidirectional CCA, according to an embodiment. The omnidirectional CCA may be performed over an omnidirectional sensing area 204. The base station 202 is an example of a wireless transmission system that performs an omnidirectional CCA.

In one embodiment corresponding to FIG. 2, a maximum EIRP for the base station 202 may be calculated based on the number of synchronization signal blocks (SSBs) transmitted by the base station 202 per SSB burst or per synchronization signal/physical broadcast channel (SS/PBCH) block measurement timing configuration (SMTC) window. This EIRP may be calculated using $P\text{Trans}+10*\log 10(S\text{Num})$ dBm, where PTrans is a transmit power useable by the base station; and SNum is the number of SSBs transmitted by the base station per SSB burst or per SMTC window.

The transmit power that is useable by the base station may be, for example, the nominal transmission power to be used by the base station 202 for transmission. Further, the use of the number of SSBs transmitted by the base station per SSB burst or per SMTC window in the above formula accounts for signal gains related to a beamforming configuration attendant with the use of a given number of SSBs in an SSB burst or an SMTC window. In other words, while the sensing for the omnidirectional CCA was performed omnidirectionally, it is anticipated that a beamforming configuration corresponding to the number of SSBs may be used for the transmission by the base station 202 (and the use of the number of SSBs per SSB burst or per SMTC window in the formula above may be designed to appropriately adjust the CCA power threshold in response to this possibility). Accordingly, it may be said that above formula describes one way of understanding a conceptual maximum EIRP of the transmission for which the omnidirectional CCA is precedent.

Once this maximum EIRP has been calculated, a corresponding CCA power threshold may be calculated. For some systems, this threshold may be calculated using:

$-47$ dBm$+P$ Max$-$EIRP, where

PMax is a transmit power upper limit on the base station, and

EIRP is the EIRP for the base station.

The −47 dBm may be used to set an initial level consistent with power levels widely deemed acceptable/common for use with CCA methods in a given context. It is anticipated that other numbers could be used in place of the −47 dBm in various cases, should a different such power level be appropriate for a different context. −47 dBm may be appropriate for, e.g., cellular network contexts generally, and NR network contexts specifically (e.g., as specified in ETSI EN 302 567 v2.1.1).

The transmit power upper limit may be a known global limit that sets an upper bound on the transmission power of one or more wireless transmission systems (such as, e.g., the base station 202). For example, in cellular network contexts generally, and NR network contexts specifically, this limit may be set to 40 dBm (e.g., as specified in ETSI EN 302 567 v2.1.1 section 4.2.2).

As one example, in an NR network, it may be that the base station 202 is configured to use 16 SSBs per SSB burst or per SMTC window, using a transmit power of 30 dBm, and the transmit power upper limit as defined in a standard is 40 dBm. The maximum EIRP is then calculated as:

30 dBm$+10*\log 10(16)$ dBm$\approx 42$ dBm and, using this maximum EIRP, the CCA power threshold is calculated as $-47$ dBm$+40$ dBm$-42$ dBm$=-49$ dBm Accordingly, in this example, the base station 202 will perform an omnidirectional CCA of a channel access mechanism that uses a CCA power threshold of −49 dBm to acquire the channel for a COT.

In other embodiments corresponding to FIG. 2, a maximum EIRP for the base station 202 useable to determine a CCA power threshold may be calculated based on a number of Tx antennas used at the base station 202. This EIRP may be calculated using $P\text{Trans}+10*\log 10(A\text{Num})$ dBm, where PTrans is a transmit power useable by the base station; and ANum is the number of Tx antennas used by the wireless transmission system.

By using both the transmit power useable by the base station and the number of Tx antennas used by the wireless transmission system, the EIRP value calculated accounts for 1) the nominal transmission power used by the base station 202 for the transmission and 2) signal gains related to multiple antenna use. While the sensing for the omnidirectional CCA was performed omnidirectionally, it is anticipated that an antenna use configuration corresponding to the number of antennas used by the base station 202 may be used for the transmission by the base station 202 (and the use of the number of Tx antennas used by the base station 202 in the formula above may be designed to appropriately adjust the CCA power threshold in response to this possibility). Accordingly, it may be said that the above formula describes one way of understanding a conceptual maximum EIRP of the transmission for which the omnidirectional CCA is precedent.

Once this maximum EIRP has been calculated, a corresponding CCA power threshold may be calculated. For some systems, this threshold may be calculated by again using:

$-47$ dBm$+P$ Max$-$EIRP, where

PMax is a transmit power upper limit on the base station, and

EIRP is the EIRP for the base station.

Discussion of the relevance of the −47 dBm and the nature of the transmit power upper limit on the base station are analogous in this case to the case described above.

As one example, in an NR network, it may be that the base station 202 is configured to use 64 antennas, a transmit power of 30 dBm, and that the relevant transmit power upper limit defined in a standard is 40 dBm. The maximum EIRP is then calculated as:

$$30\ dBm + 10 * \log 10(64)\ dBm \approx 48\ dBm$$

and, using this maximum EIRP, the CCA power threshold is calculated as $$-47\ dBm + 40\ dBm - 48\ dBm = -55\ dBm$$

Accordingly, in this example, the base station 202 will perform an omnidirectional CCA of a channel access mechanism that uses a CCA power threshold of −55 dBm to acquire the channel for a COT.

Relative to the embodiments discussed for the base station 202 of FIG. 2 as found above (e.g., using either number of SSBs per SSB burst or per SMTC window, or number of Tx antennas), it is anticipated that the CCA power threshold determined using such methods may be further determined (adjusted) to account for sector based base stations. For example, if the base station is sector based, the CCA power threshold may be adjusted downward by −5 dBm. For example, a CCA power threshold calculated as described above to be, for example, −55 dBm may be further adjusted to −60 dBm.

In whichever of the above cases, after the base station 202 uses an omnidirectional CCA to acquire the channel for a COT, the base station 202 may use the COT to perform one or more transmissions with powers according to (e.g., not exceeding) the maximum EIRP used to calculate the CCA power threshold used to acquire the channel for the COT.

These transmissions may include, for example, a scheduling message sent during the COT to one or more UEs that schedules one or more transmissions to the one or more UEs on a physical downlink shared control channel (PDSCH) during the COT. For example, the base station 202 may send a scheduling message to the first UE 206 during the COT that schedules one or more transmissions to the first UE 206 on the PDSCH during the COT. Additionally (or alternatively), the base station 202 may send a (same or different) scheduling message to the second UE 208 during the COT that schedules one or more transmissions to the second UE 208 on the PDSCH during the COT.

Further, these transmissions may include, for example, a scheduling message sent during the COT to one or more UEs that schedules one or more transmissions by the one or more UEs on a physical uplink shared control channel (PUSCH) during the COT. For example, the base station 202 may send a scheduling message to the first UE 206 during the COT that schedules one or more transmissions by the first UE 206 on the PUSCH during the COT. Additionally (or alternatively), the base station 202 may send a same (or different) scheduling message to the second UE 208 during the COT that schedules one or more transmissions by the second UE 208 on the PUSCH during the COT. In some embodiments, prior to scheduling the one or more transmissions by either/both of the first UE 206 and/or the second UE 208, the base station 202 may first determine that a sum of respective EIRPs for each of the first UE 206 and the second UE 208 that is to transmit is less than (or less than or equal to) the maximum EIRP for the base station that was used to determine the CCA power threshold. This check may avoid a situation where UEs instructed by the base station to transmit during the COT use (in sum) more power than was under consideration relative to the determined CCA power threshold.

Figure 3:
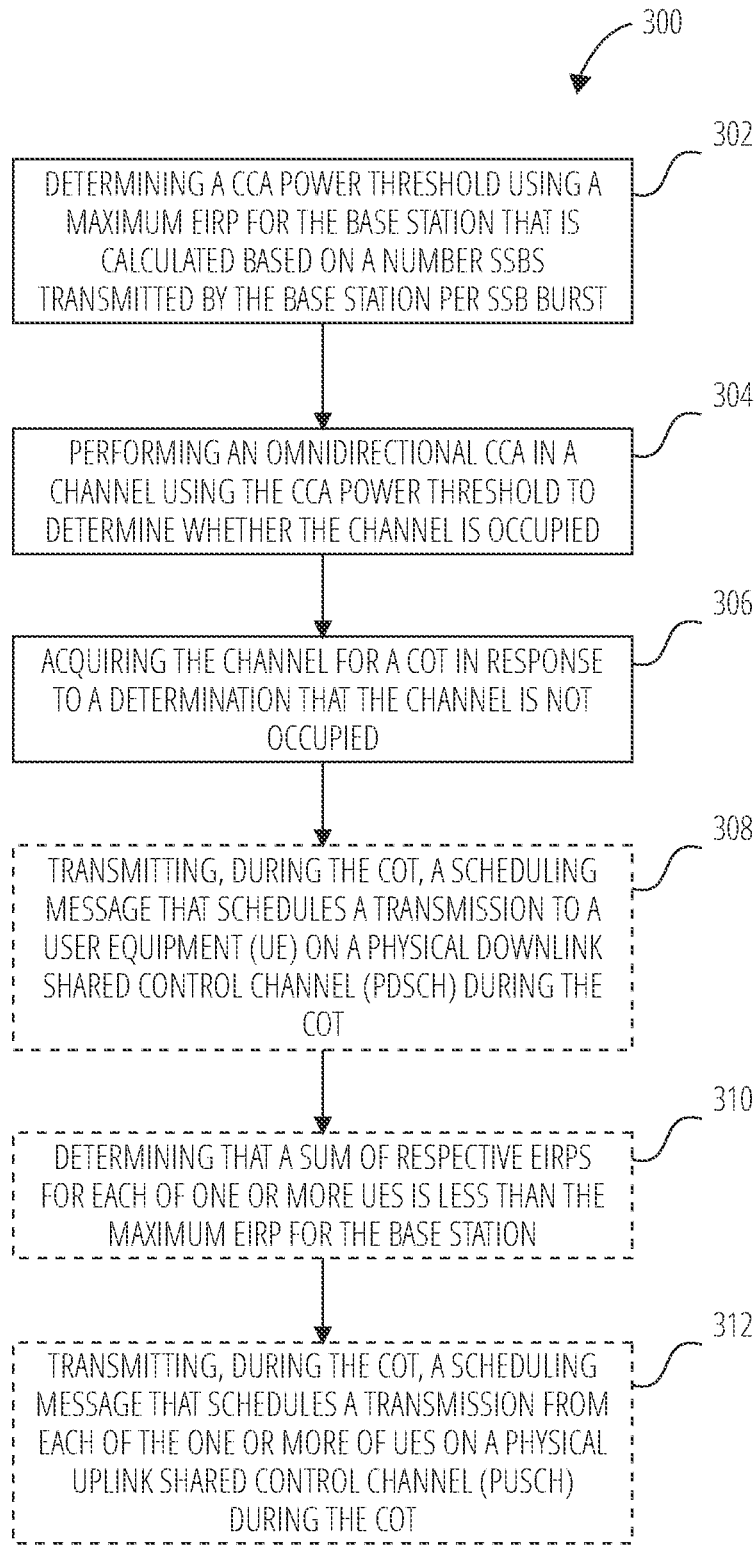
FIG. 3 illustrates a method of a base station, according to an embodiment.

FIG. 3 illustrates a method 300 of a base station, according to an embodiment. The method 300 includes determining 302 a CCA power threshold using a maximum EIRP for the base station that is calculated based on a number SSBs transmitted by the base station per SSB burst. It is anticipated that in some embodiments corresponding to FIG. 3, the EIRP for the base station may instead be calculated based on a number of SSBs transmitted by the base station per SMTC window.

The method 300 further includes performing 304 an omnidirectional CCA in a channel using the CCA power threshold to determine whether the channel is occupied.

The method 300 further includes acquiring 306 the channel for a COT in response to a determination that the channel is not occupied.

The method 300 further optionally includes transmitting 308, during the COT, a scheduling message that schedules a transmission to a user equipment (UE) on a physical downlink shared control channel (PDSCH) during the COT.

The method 300 further optionally includes determining 310 that a sum of respective EIRPs for each of one or more UEs is less than the maximum EIRP for the base station.

The method 300 further optionally includes transmitting 312, during the COT, a scheduling message that schedules a transmission from each of the one or more of UEs on a physical uplink shared control channel (PUSCH) during the COT.

Figure 4:
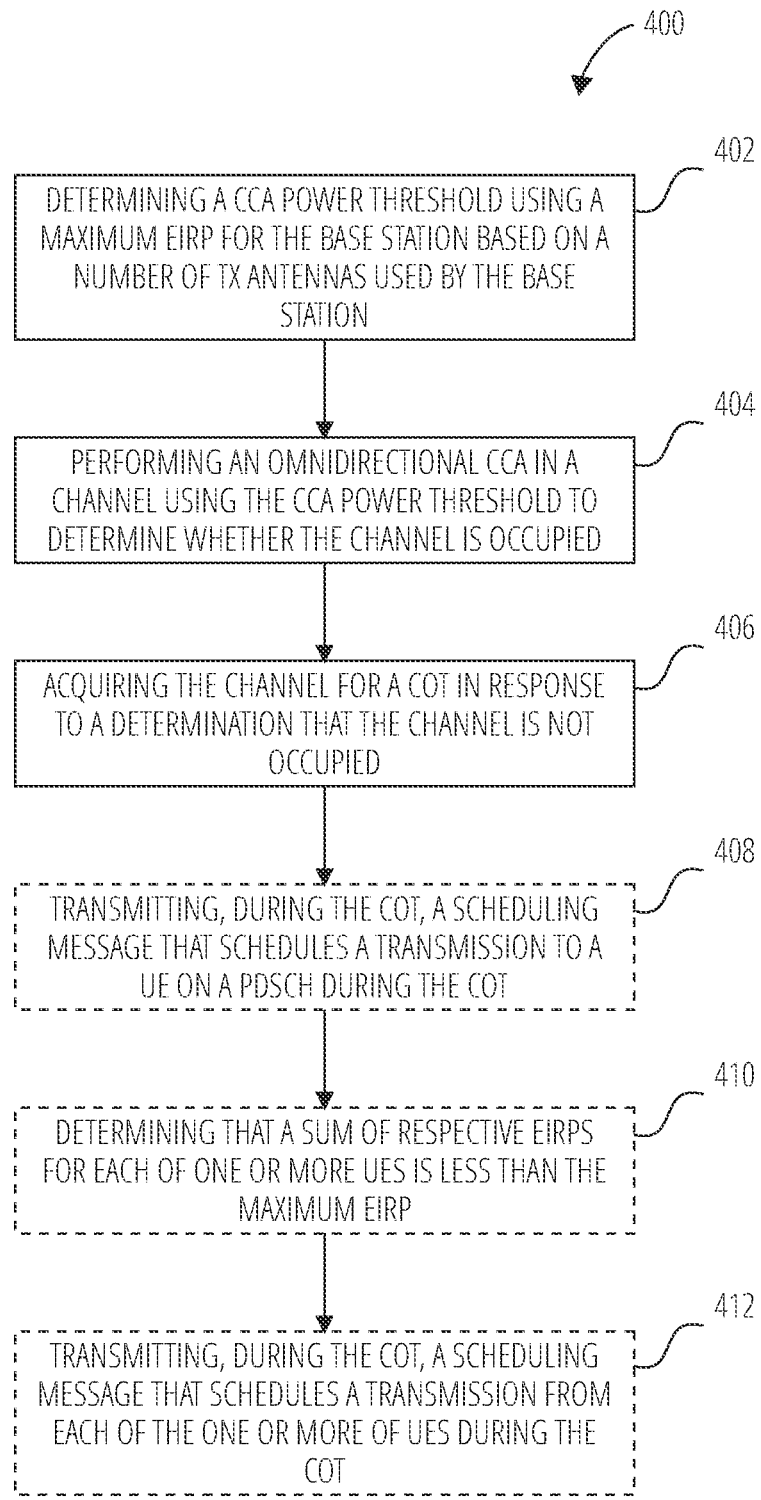
FIG. 4 illustrates a method of a base station, according to an embodiment.

FIG. 4 illustrates a method 400 of a base station, according to an embodiment. The method 400 includes determining 402 a CCA power threshold using a maximum EIRP for the base station based on a number of Tx antennas used by the base station.

The method 400 further includes performing 404 an omnidirectional CCA in a channel using the CCA power threshold to determine whether the channel is occupied.

The method 400 further includes acquiring 406 the channel for a COT in response to a determination that the channel is not occupied.

The method 400 further optionally includes transmitting 408, during the COT, a scheduling message that schedules a transmission to a UE on a PDSCH during the COT.

The method 400 further optionally includes determining 410 that a sum of respective EIRPs for each of one or more of UEs is less than the maximum EIRP.

The method 400 further optionally includes transmitting 412, during the COT, a scheduling message that schedules a transmission from each of the one or more of UEs during the COT.

Figure 5:
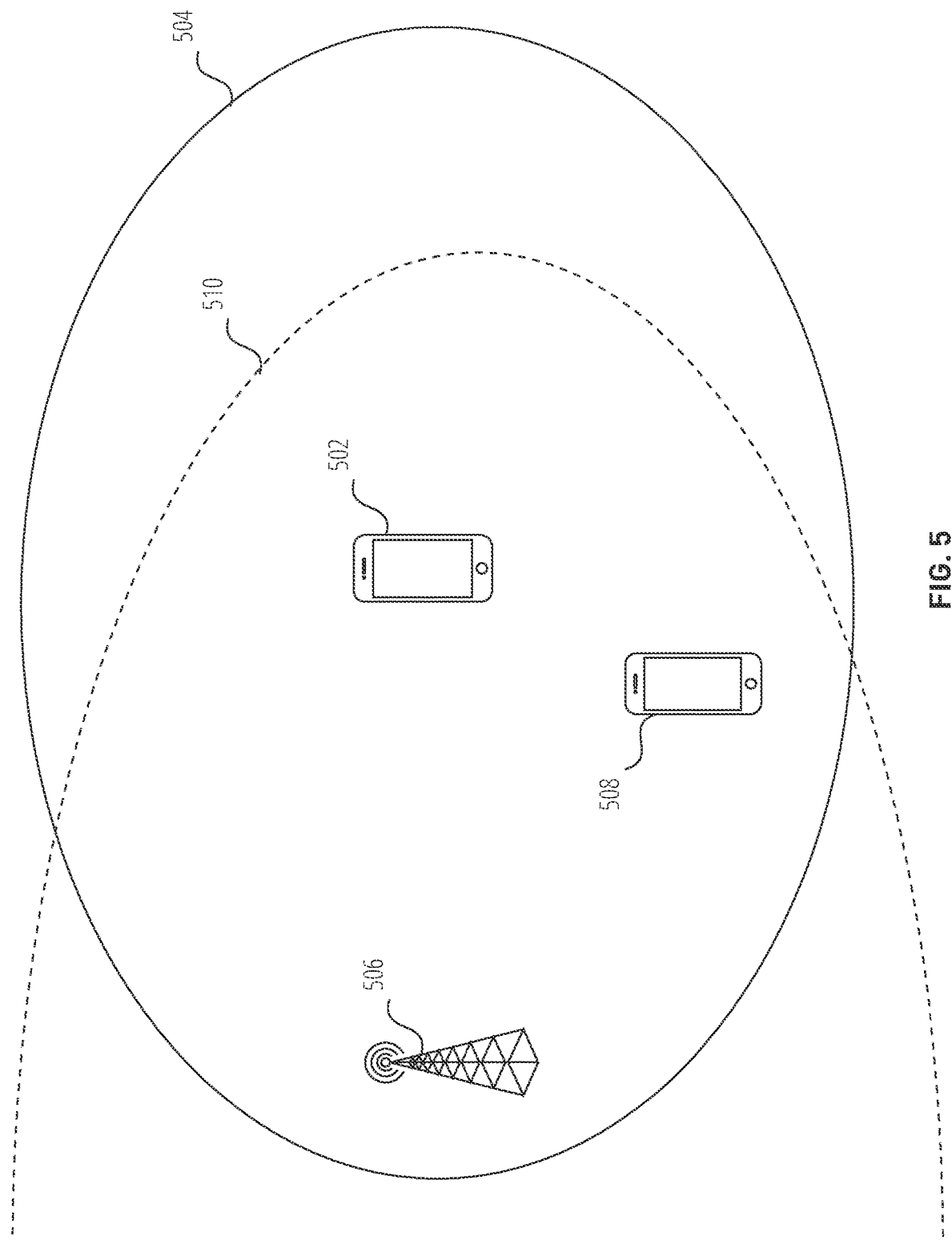
FIG. 5 illustrates a UE that can perform an omnidirectional CCA, according to an embodiment.

FIG. 5 illustrates a UE 502 than can perform an omnidirectional CCA, according to an embodiment. The omnidirectional CCA may be performed over an omnidirectional sensing area 504. The UE 502 is an example of a wireless transmission system that performs an omnidirectional CCA.

In embodiments corresponding to FIG. 5, a maximum EIRP for the UE 502 useable to determine a CCA power threshold may be calculated based on a number of Tx antennas used at the UE 502. This EIRP may be calculated using $$P\text{Trans} + 10 * \log 10(A\text{Num})\ dBm,\ \text{where}$$

PTrans is a transmit power useable by the UE 502; and
ANum is the number of Tx antennas used by the UE 502.
By using both the transmit power that is useable by the UE 502 and the number of Tx antennas used by the UE 502, the EIRP value calculated accounts for 1) the nominal transmission power that may be used by the base station UE 502 for the transmission and 2) signal gains related to multiple antenna use. While the sensing for the omnidirectional CCA was performed omnidirectionally, it is anticipated that an antenna use configuration corresponding to the number of antennas used by the UE 502 may be used for the transmission by the UE 502 (and the use of the number of Tx antennas used by the UE 502 in the formula above may be designed to appropriately adjust the CCA power threshold in response to this possibility). Accordingly, it may be said that above formula describes one way of understanding a conceptual maximum EIRP of the transmission for which the omnidirectional CCA is precedent.

Once this maximum EIRP has been calculated, a corresponding CCA power threshold may be calculated. For some systems, this threshold may be calculated by again using:

$$-47 \text{ dBm} + P\text{Max} - \text{EIRP, where}$$

PMax is a transmit power upper limit on the UE 502, and EIRP is the EIRP for the UE 502.

Discussion of the relevance of the −47 dBm and the nature of the transmit power upper limit on, for example, the UE 502 are analogous in this case to the case described above.

As one example, in an NR network, it may be that the UE 502 is configured to use 16 antennas, a transmit power of 23 dBm, and that the relevant transmit power upper limit defined in a standard is 40 dBm. The maximum EIRP is then calculated as:

$$23 \text{ dBm} + 10*\log 10(16) \text{ dBm} \approx 35 \text{ dBm}$$

and, using this maximum EIRP, the CCA power threshold is calculated as $$-47 \text{ dBm} + 40 \text{ dBm} - 35 \text{ dBm} = -42 \text{ dBm}$$

Accordingly, in this example, the UE 502 will perform an omnidirectional CCA of a channel access mechanism that uses a CCA power threshold of −42 dBm to acquire the channel for a COT.

As can be seen, due to the lower transmit power of the UE 502 (23 dBm) as compared to, for example, the examples given above in relation to the base station 202 (which each use 30 dBm as the useable transmit power by the base station 202), the CCA power threshold for the UE 502 is (as a general matter) higher than that which would be calculated for the base station 202, all else being equal. In other words, devices with higher transmit power will have lower CCA power thresholds, which helps the fair sharing of the channel for the reasons given above.

After the UE 502 uses an omnidirectional CCA to acquire the channel for a COT, the UE 502 may use the COT to perform one or more transmissions according to (e.g., not exceeding) the maximum EIRP used to calculate the CCA power threshold used to acquire the channel for the COT.

These transmissions may include, for example, a communication of the maximum EIRP to a base station. Further, in some embodiments, it may be that a base station may then use the COT to transmit on the channel to one or more devices within its cell area using an EIRP up to the EIRP received in the communication. For example, the UE 502 may, during the COT, transmit a communication of the maximum EIRP used to calculate the CCA power threshold used to acquire the channel for the COT to the base station 506. The base station 506 may then transmit one or more messages to the second UE 508, which is in the cell area 510 of the base station 506, so long as the base station 506 uses an EIRP that is less than (or less than or equal to) the communicated maximum EIRP to do so.

Figure 6:
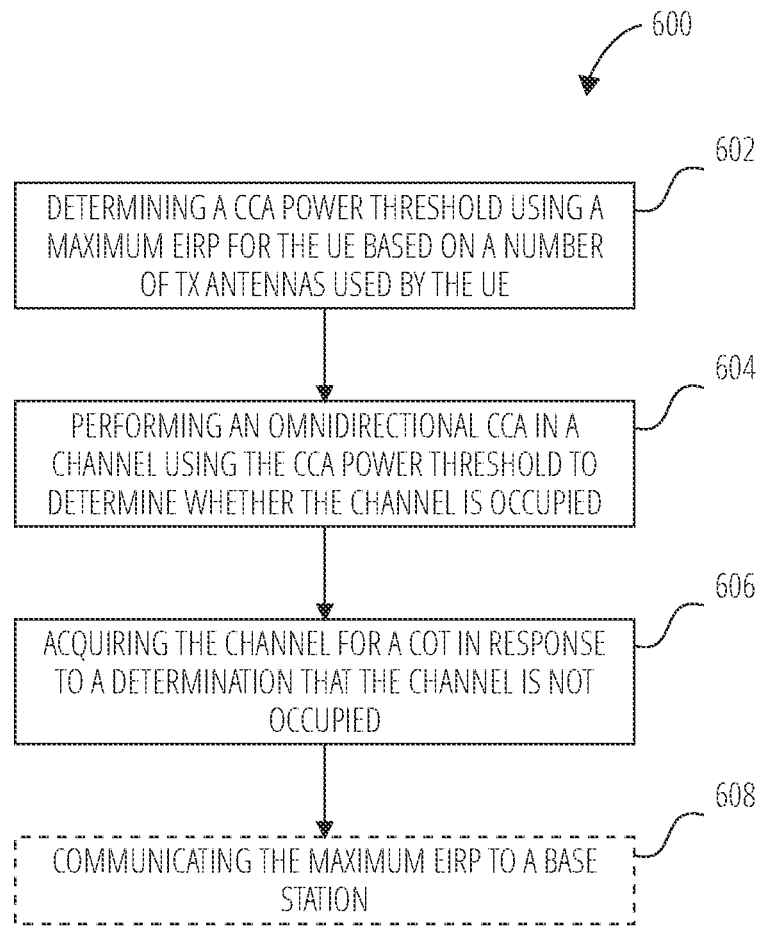
FIG. 6 illustrates a method of a UE, according to an embodiment.

FIG. 6 illustrates a method of a UE, according to an embodiment. The method 600 includes determining 602 a CCA power threshold using a maximum EIRP for the UE based on a number of Tx antennas used by the UE.

The method 600 further includes performing 604 an omnidirectional CCA in a channel using the CCA power threshold to determine whether the channel is occupied.

The method 600 further includes acquiring 606 the channel for a COT in response to a determination that the channel is not occupied.

The method 600 further optionally includes communicating 608 the maximum EIRP to a base station.

For purposes of this disclosure, "directional CCA" means a CCA where sensing is performed by multiple antennas of the wireless transmission system, in accordance with a beamforming used by the system. Various examples illustrating wireless transmission systems performing a directional CCA using a calculated CCA power threshold that is based on an EIRP follow.

Further, for purposes of this disclosure, "corresponding beams" means a Tx beam and a receive (Rx) beam that correspond to the same (or at least a similar) beamforming at the device. For example, a base station that uses a first plurality of antennas to form a Tx beam can form a corresponding Rx beam by using those same antennas.

Various examples illustrating wireless transmission systems performing a directional CCA using a calculated CCA power threshold follow. Differently from the case of an omnidirectional CCA, a directional CCA may include the performance of a CCA respective to a beam that is to be used to transmit by the wireless transmission system once it acquires a channel. For example, a wireless transmission system may use an Rx beam that corresponds to an intended Tx beam in order to perform the CCA in the direction of the intended Tx beam. (rather than omnidirectionally) Further, when the channel is finally acquired, the transmissions allowed during the corresponding COT may be limited to transmissions (either by or to the wireless transmission system) with similar spatial usage of the channel as the intended Tx beam, as will be described in more detail below. Such the targeting of a specific spatial directions/areas within the channel using directional CCA may enable more efficient use of the channel than in the omnidirectional case.

Figure 7:
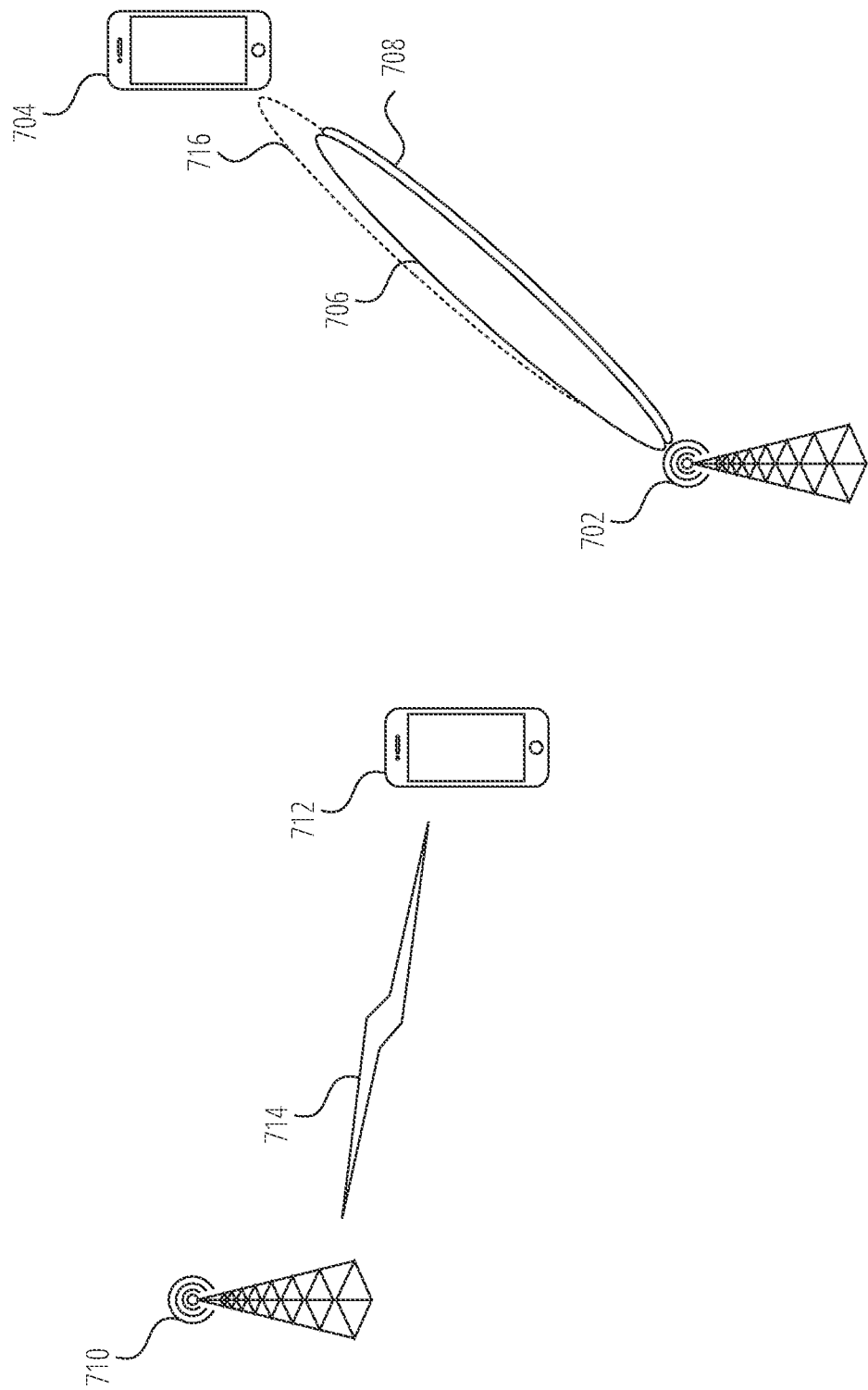
FIG. 7 illustrates a base station than can perform a directional CCA, according to an embodiment.

FIG. 7 illustrates a base station 702 than can perform a directional CCA, according to an embodiment. The base station 702 is an example of a wireless transmission system that performs a directional CCA.

In some embodiments according to FIG. 7, the base station 702 performs a directional CCA in relation to a transmission to a UE 704 on the intended Tx beam 706. To do this, the UE 704 may perform CCA on the corresponding Rx beam 708 (so named because it corresponds to the intended Tx beam 706) which may inform about the energy level in the spatial portion of the channel that the intended Tx beam 706 will use. In this way, the UE 704 performs the CCA according to the spatial characteristics of the intended Tx beam 706.

The use of the directional CCA may allow for more efficient use of a channel. For example, although the spatial characteristics of a transmission 714 in the channel between, for example, a second base station 710 and a second UE 712 would have caused a deferral for one or more slots during a CCA time of an omnidirectional CCA at the base station 702, the transmission 714 may not cause a deferral during the CCA time of the directional CCA illustrated in FIG. 7, because the corresponding Rx beam 708 upon which the CCA is performed may be spatially located such that energy from the transmission 714 is not detected above a CCA power threshold in that area.

Because the intended Tx beam 706 is known at the base station 702, the base station may know the actual EIRP of the transmission(s) on the intended Tx beam 706. Accordingly, in some embodiments, the applicable CCA power threshold may then be calculated by again using:

−47 dBm+$P$ Max−EIRP, where

PMax is a transmit power upper limit on the base station 702, and

EIRP is the actual EIRP of the intended Tx beam 706.

Discussion of the relevance of the −47 dBm and the nature of the a transmit power upper limit on, for example, the intended Tx beam 706 are analogous in this case to the cases described above.

Once the directional CCA is so performed, the base station 702 acquires the channel in the direction of the intended Tx beam 706 for a COT. In other words, the base station 702 may limit its use of the channel attendant to this channel acquisition to the use of the intended Tx beam 706 during the COT.

After the base station 702 uses a directional CCA to acquire the channel in the direction of the intended Tx beam 706 for a COT, the base station 202 may use the COT to perform one or more transmissions to the UE 704 on the intended Tx beam 706 and according to (e.g., not exceeding) the EIRP used to calculate the CCA power threshold used to acquire the channel for the COT.

These transmissions may include, for example, a scheduling message during the COT to the UE 704 that schedules one or more transmissions to the UE 704 on a PDSCH during the COT. These (additional) one or more transmissions may also be limited to using the intended Tx beam 706.

Further, these transmissions may include, for example, a scheduling message to the UE 704 during the COT that schedules one or more transmissions by the UE 704 on a PUSCH during the COT. In some embodiments, any transmission by the UE will be limited to a UE Tx beam 716 that has a similar spatial usage of the channel as the intended Tx beam 706. For example, the UE Tx beam 716 may be pointed towards the base station 702, substantially in reverse of the direction of the intended Tx beam 706. Further, the length and width of the UE Tx beam 716 may correspond to the length and width of the intended Tx beam 706.

Figure 8:
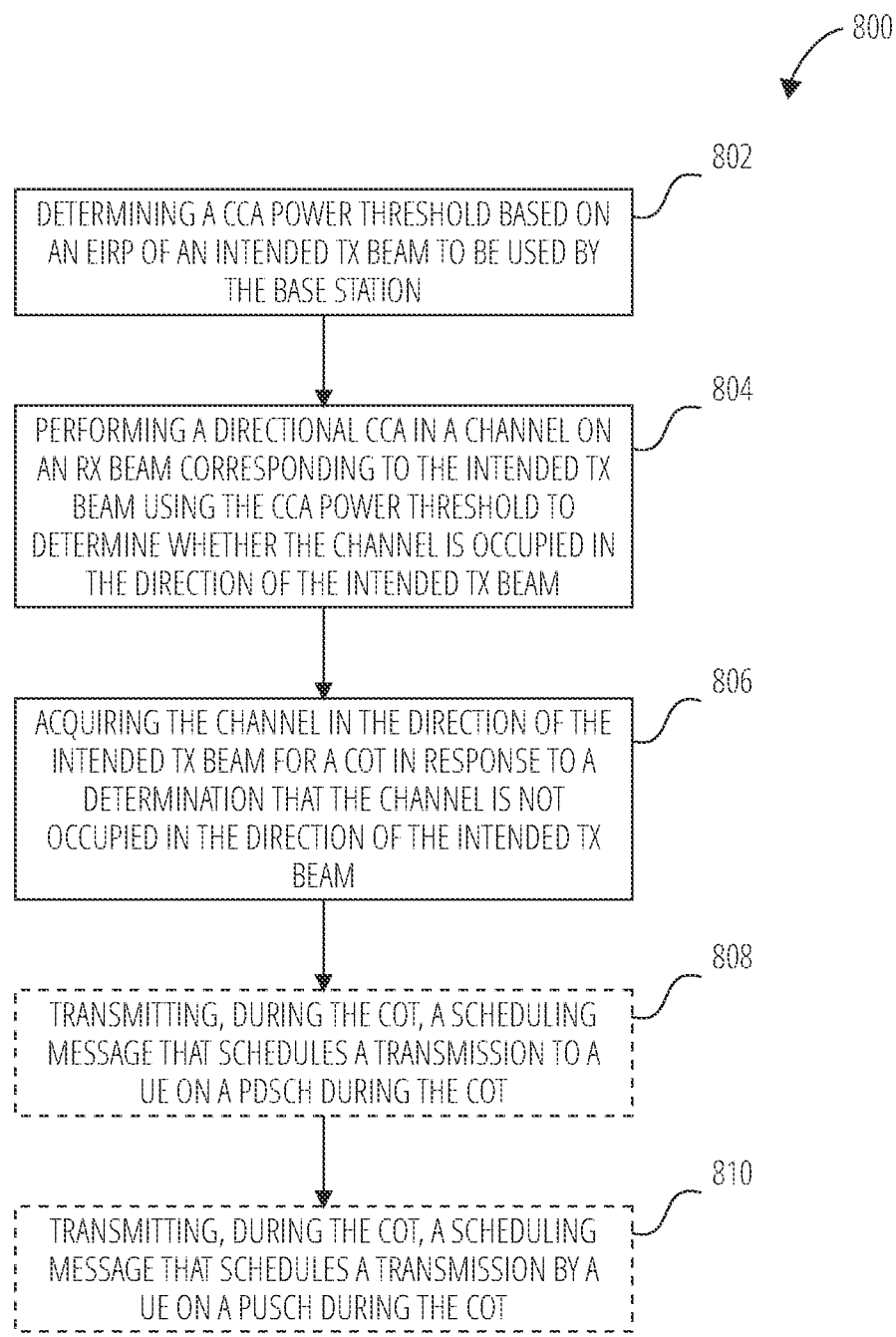
FIG. 8 illustrates a method of a base station, according to an embodiment.

FIG. 8 illustrates a method of a base station, according to an embodiment. The method 800 includes determining 802 a CCA power threshold based on an EIRP of an intended TX beam to be used by the base station.

The method 800 further includes performing 804 a directional CCA in a channel on an Rx beam corresponding to the intended Tx beam using the CCA power threshold to determine whether the channel is occupied in the direction of the intended Tx beam.

The method 800 further includes acquiring 806 the channel in the direction of the intended Tx beam for a COT in response to a determination that the channel is not occupied in the direction of the intended Tx beam.

The method 800 further optionally includes transmitting 808, during the COT, a scheduling message that schedules a transmission to a UE on a PDSCH during the COT.

The method 800 further optionally includes transmitting 810, during the COT, a scheduling message that schedules a transmission by a UE on a PUSCH during the COT.

Figure 9:
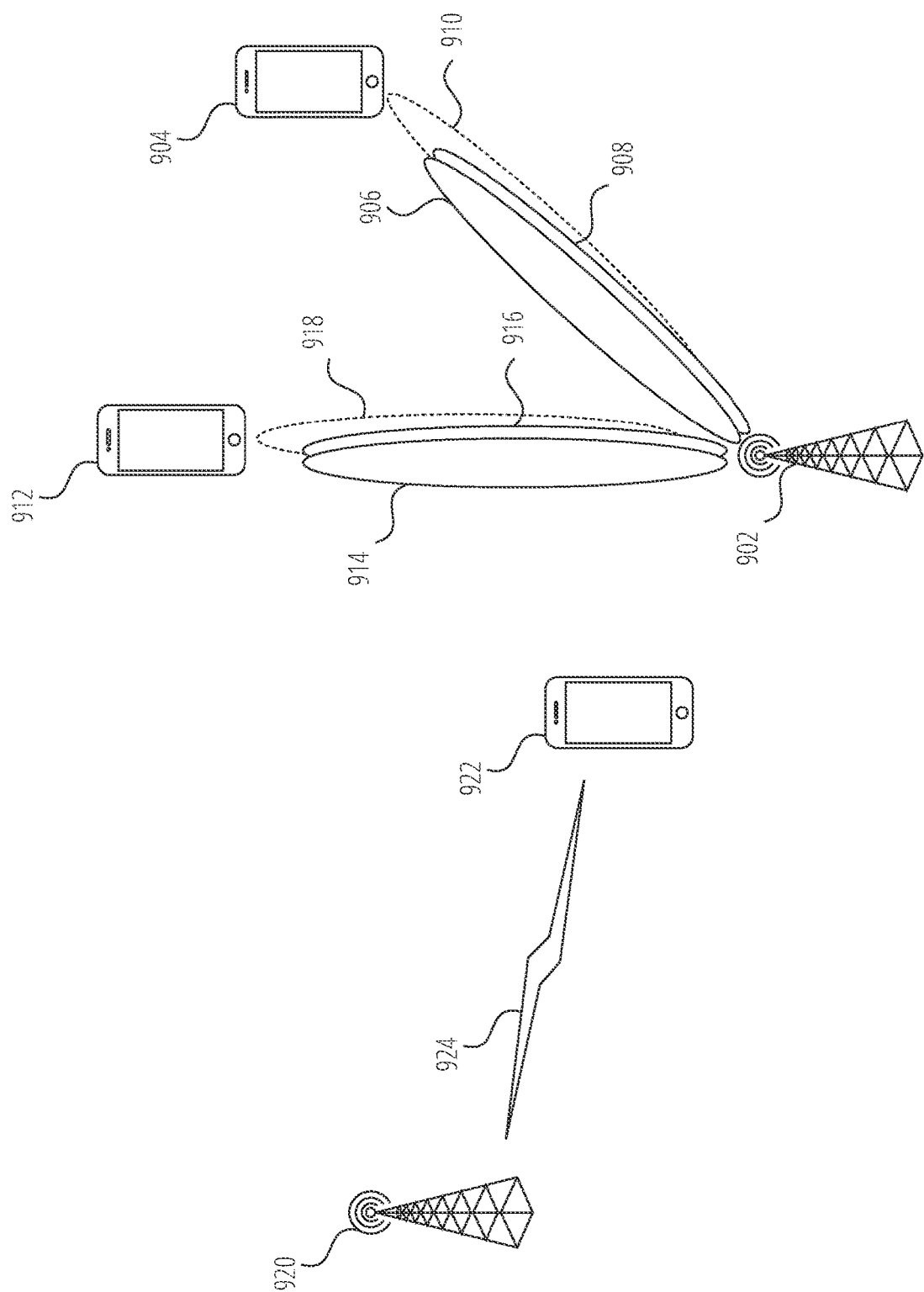
FIG. 9 illustrates a base station that can perform a directional CCA in multiple directions, according to an embodiment.

FIG. 9 illustrates a base station 902 that can perform a directional CCA in multiple directions, according to an embodiment. The base station 902 is an example of a wireless transmission system that performs a directional CCA.

In some embodiments, a base station performs a directional CCA in relation to transmissions to multiple UEs on multiple (respective) intended Tx beams. As will be described below, in this case, multiple corresponding RX beams are used.

In one embodiment according to FIG. 9, the base station 902 performs a directional CCA in relation to both a transmission to a first UE 904 on the first intended Tx beam 906 and a transmission to a second UE 912 on the second intended Tx beam 914. To do this, the UE 904 may perform the directional CCA in both the direction of the first corresponding Rx beam 908 and the second corresponding Rx beam 916 by using, respectively, the first corresponding Rx beam 908 and the second corresponding Rx beam 916. The use of said corresponding Rx beams in this fashion may allow the base station 902 to sense the energy level in the spatial portion of the channel that the first intended Tx beam 906 and the second intended Tx beam 914, respectively, will use.

Although the power from a transmission 924 in the channel between, for example, a second base station 920 and a third UE 922 would have caused a deferral for one or more slots during a CCA time of an omnidirectional CCA at the base station 902, the transmission 924 may not cause a deferral during the CCA time of the directional CCA illustrated in FIG. 9, because each of the first corresponding Rx beam 908 and the second corresponding Rx beam 916 upon which the CCA is performed may be spatially located such that energy from the transmission 924 is not detected above an applicable CCA power threshold in their respective locations.

Because the first intended Tx beam 906 and the second intended Tx beam 914 are each known at the base station 902, the base station may know the actual EIRP of the transmission(s) on each of the first intended Tx beam 906 and the second intended Tx beam 914. Accordingly, in some embodiments, a unique CCA power threshold for use with the CCA on each respective corresponding Rx beam may then be calculated by again using:

−47 dBm+$P$ Max−EIRP, where

PMax is a transmit power upper limit on the base station 702, and

EIRP is the actual EIRP of the first intended Tx beam 906 or the second intended Tx beam 914 (which may be different), as applicable.

Discussion of the relevance of the −47 dBm and the nature of the a transmit power upper limit on, for example, the first intended Tx beam 906 and the second intended Tx beam 914 are analogous in this case to the cases described above.

The CCA performed by the base station 902 may use individual CCA times to perform the directional CCA using multiple corresponding Rx beams. For example, a first CCA time is used to sense the channel using the first corresponding Rx beam 908 and a second CCA time is used to sense the channel using the second corresponding Rx beam 916. These CCA times may run concurrently, or one CCA time may need to run prior to the running of the second CCA time. In the concurrent case where, for example, the first CCA time used to sense the channel using the first corresponding Rx beam 908 finishes first, the wireless transmission system may further append slots to (e.g., sense for additional slot durations of) the first CCA time until the second CCA time used to sense the channel using the second corresponding Rx beam 916 also expires. Once both CCA times have expired, the wireless transmission system may acquire the channel in the direction of the first intended Tx beam 906 and the second intended Tx beam 914 and may transmit using either of the first intended Tx beam 906 and/or the second intended Tx beam 914 during the associated COT.

In some cases, it may be that if the first corresponding Rx beam 908 is clearer than the second corresponding Rx beam 916, such that that the CCA time corresponding to the first corresponding Rx beam 908 expires prior to the CCA time of the second corresponding Rx beam 916, the wireless transmission system utilizing the CCA may instead acquire the channel in the direction of the first intended Tx beam 906 (only) and may transmit only in the direction of the first intended Tx beam 906 during the associated COT. The wireless transmission system may then in this case effectively proceed in the manner that was discussed above in relation to FIG. 7.

In other embodiments, a single CCA time for the CCA performed by the base station 902 may instead be divided between use of the first corresponding Rx beam 908 to sense the channel and use of the second corresponding Rx beam 916 to sense the channel. The wireless transmission system may sense the channel during one or more slots of the CCA time using first corresponding Rx beam 908 and may sense the channel during one or more other slots of the CCA time using the second corresponding Rx beam 916. The pattern of which slot of the CCA time to use for which corresponding Rx beam may be assigned to the wireless transmission system, preconfigured in the wireless transmission system, or chosen by the wireless transmission system.

In any of the above cases (either using individual CCA times for each corresponding Rx beam or a shared CCA time between each corresponding Rx beam) it may be that the final slot of a CCA time just prior to the acquisition of the channel in the direction of either and/or both of the first intended Tx beam 906 and the second intended Tx beam 914 (e.g., the final slot of the directional CCA) performs its detection in an omnidirectional fashion, or simultaneously in the direction of both the first corresponding Rx beam 908 and the second corresponding Rx beam 916. This may act as a more generalized check on the energy level in the channel in (more or less) each of the directions of the first corresponding Rx beam 908 and the second corresponding Rx beam 916 just prior to such acquisition.

After the base station 902 uses a directional CCA to acquire the channel in the direction of the first intended Tx beam 906 and the second intended Tx beam 914 for a COT, the base station 202 may use the COT to perform one or more transmissions to the first UE 904 on the first intended Tx beam 906 and/or the second UE 912 on the second intended Tx beam 914 according to (e.g., not exceeding) the respective EIRP used to calculate the CCA power threshold used to acquire the channel for the COT in that respective direction (where such CCA power thresholds may have been different for the different directions, as described above).

These transmissions may include, for example, one or more scheduling messages during the COT to one or both of the first UE 904 and the second UE 912 that schedule one or more transmissions to one or both of the first UE 904 and the second UE 912 on a PDSCH during the COT. These (additional) one or more transmissions may also be limited to using, respectively, the first intended Tx beam 906 and/or the second intended Tx beam 914.

Further, these transmissions may include, for example, one or more scheduling messages to either of the first UE 904 and/or the second UE 912 during the COT that schedule one or more transmissions by the respective UE on a PUSCH during the COT. These (additional) one or more transmissions may also be limited to using, respectively, the first intended Tx beam 906 and/or the second intended Tx beam 914. In some embodiments, any transmission by the first UE 904 will be limited to a first UE Tx beam 910 that has a similar spatial usage of the channel as the first intended Tx beam 906, and any transmission by the second UE 912 will be limited to a second UE Tx beam 918 that has a similar spatial usage of the channel as the second intended Tx beam 914. For example, the first UE Tx beam 910 may be pointed towards the base station 902, substantially in reverse of the direction of the first intended Tx beam 906. Further, the length and width of the first UE Tx beam 910 may correspond to the length and width of the first intended Tx beam 906. Analogous considerations would apply to the second UE Tx beam 918 as to the second intended Tx beam 914, as illustrated.

While FIG. 9 illustrates the use of directional CCA to (among other possibilities) grant transmission time to the multiple UEs on a PUSCH during the COT, it is anticipated that there may be situations where the use of directional CCA to acquire a COT is less efficient or otherwise less desirable than instead using an omnidirectional COT. Accordingly, if the base station 902 intends to acquire a COT for the purpose of granting PUSCH transmission time to the first UE 904 and/or the second UE 912, the base station 902 may optionally instead fall back to the omnidirectional CCA methods described above to do so.

Figure 10A:
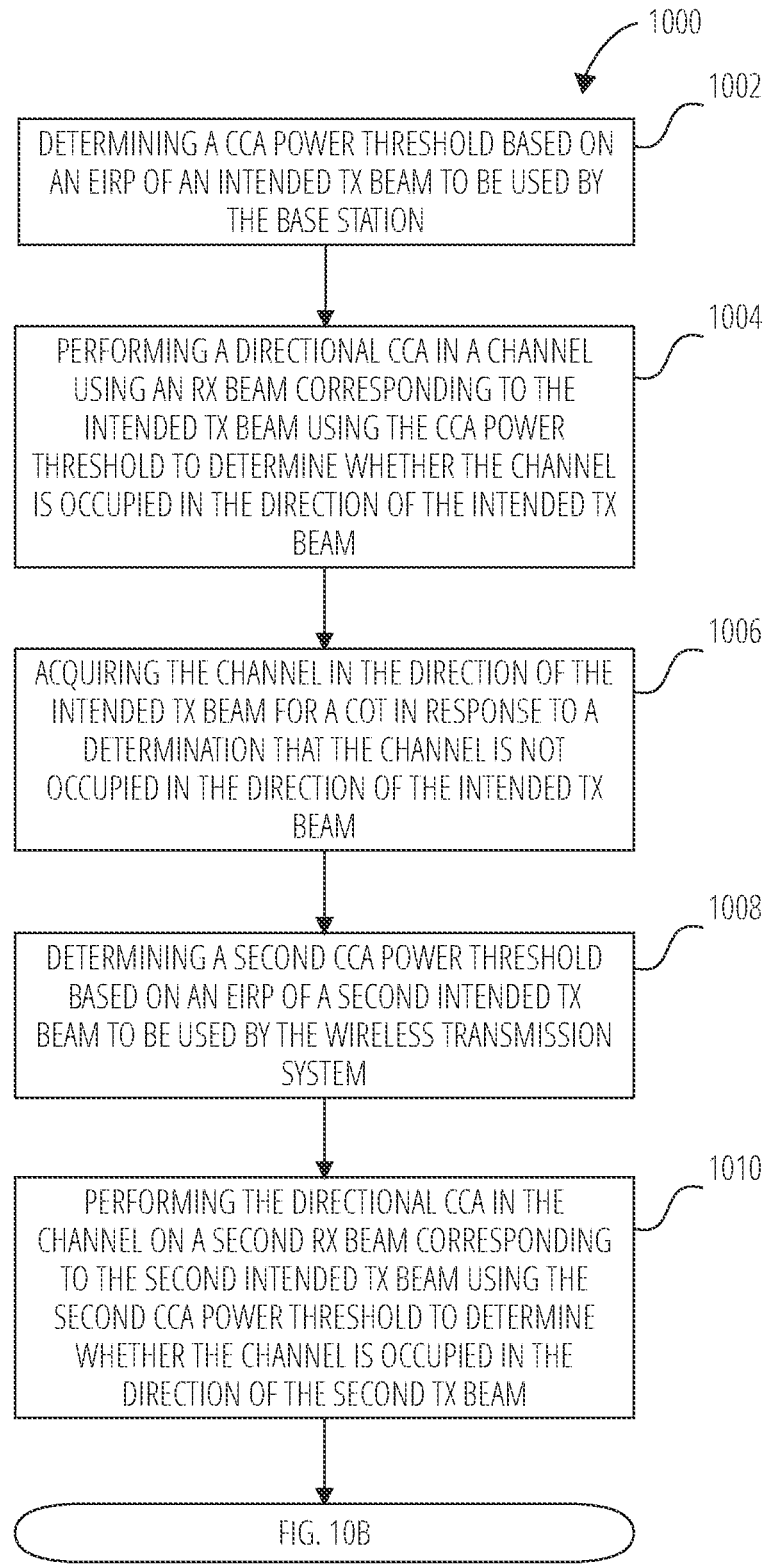
FIG. 10A and FIG. 10B together illustrate a method of a base station, according to an embodiment.
Figure 10B:
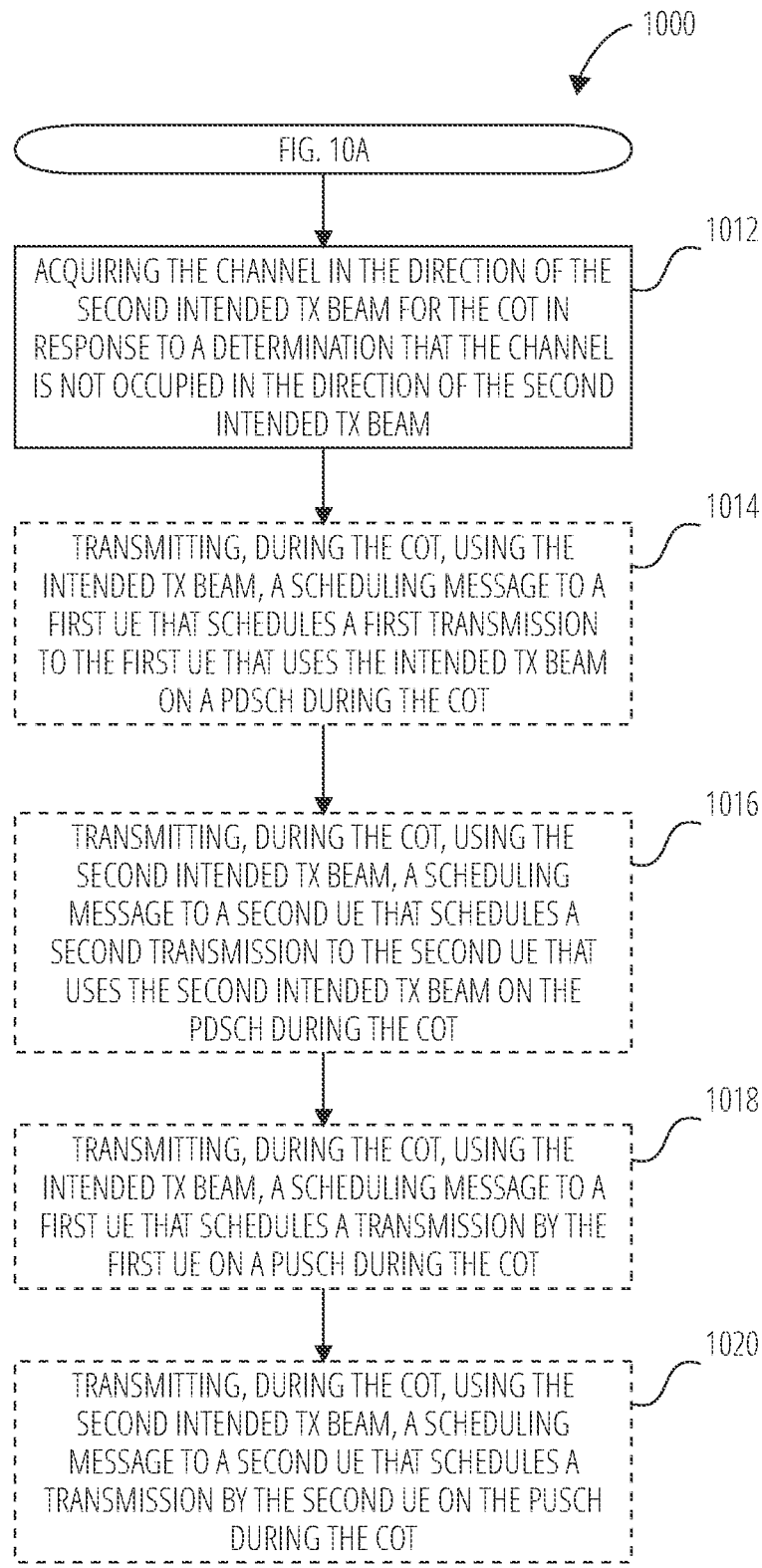

FIG. 10A and FIG. 10B together illustrate a method 1000 of a base station, according to an embodiment. The method 1000 includes determining 1002 a CCA power threshold based on an EIRP of an intended TX beam to be used by the wireless transmission system.

The method 1000 further includes performing 1004 a directional CCA in a channel using an Rx beam corresponding to the intended Tx beam using the CCA power threshold to determine whether the channel is occupied in the direction of the intended Tx beam.

The method 1000 further includes acquiring 1006 the channel in the direction of the intended Tx beam for a COT in response to a determination that the channel is not occupied in the direction of the intended Tx beam.

The method 1000 further includes determining 1008 a second CCA power threshold based on an EIRP of a second intended Tx beam to be used by the wireless transmission system.

The method 1000 further includes performing 1010 the directional CCA in the channel on a second Rx beam corresponding to the second intended Tx beam using the second CCA power threshold to determine whether the channel is occupied in the direction of the second Tx beam.

The method 1000 further includes acquiring 1012 the channel in the direction of the second intended Tx beam for the COT in response to a determination that the channel is not occupied in the direction of the second intended Tx beam.

The method 1000 further optionally includes transmitting 1014, during the COT, using the intended Tx beam, a scheduling message to a first UE that schedules a first transmission to a first UE that uses the intended Tx beam on a PDSCH during the COT.

The method 1000 further optionally includes transmitting 1016, during the COT, using the second intended Tx beam, a scheduling message to a second UE that schedules a second transmission to the second UE that uses the second intended Tx beam on the PDSCH during the COT.

The method 1000 further optionally includes transmitting 1018, during the COT, using the intended Tx beam, a scheduling message to a first UE that schedules a transmission by the first UE on a PUSCH during the COT.

The method 1000 further optionally includes transmitting 1020, during the COT, using the second intended Tx beam, a scheduling message to a second UE that schedules a transmission by the second UE on the PUSCH during the COT.

Figure 11:
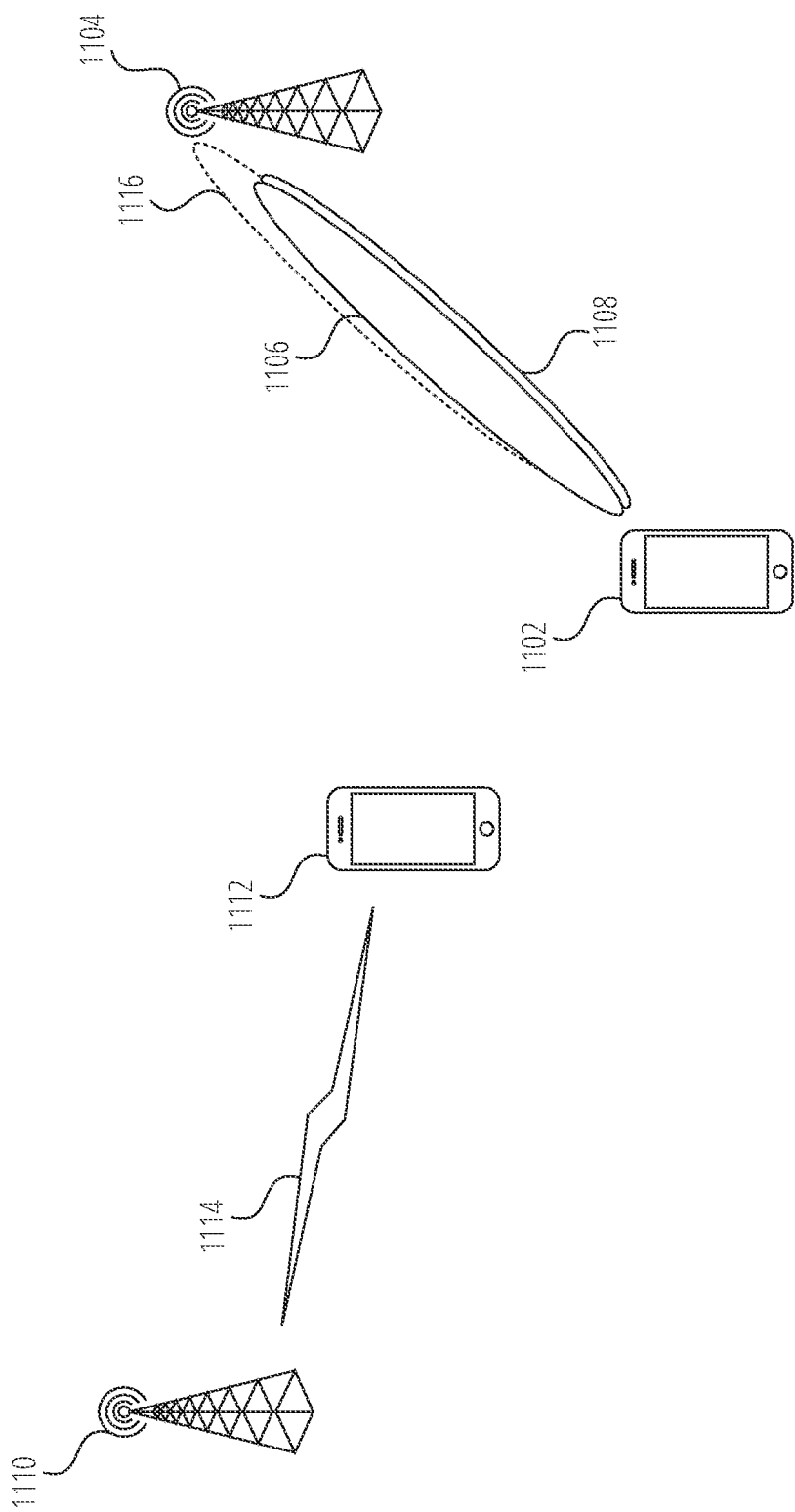
FIG. 11 illustrates a UE that can perform a directional CCA, according to an embodiment.

FIG. 11 illustrates a UE 1102 that can perform a directional CCA, according to an embodiment. The UE 1102 is an example of a wireless transmission system that performs a directional CCA.

In some embodiments according to FIG. 11, the UE 1102 performs a directional CCA in relation to a transmission to a base station 1104 on the intended Tx beam 1106. To do this, the UE 1102 may perform CCA on the corresponding Rx beam 1108.

Although a transmission 1114 in the channel between, for example, a second base station 1110 and a second UE 1112 would have caused a deferral for one or more slots during a CCA time of an omnidirectional CCA at the UE 1102, the transmission 1114 may not cause a deferral during the CCA time of the directional CCA illustrated in FIG. 11, because the corresponding Rx beam 1108 upon which the CCA is performed may be spatially located such that energy from the transmission 1114 is not detected above a CCA power threshold in that location.

Because the intended Tx beam 1106 is known at the UE 1102, the UE 1102 may know the actual EIRP of the transmission(s) made using the intended Tx beam 1106. Accordingly, in some embodiments, the CCA power threshold may then be calculated by again using:

−47 dBm+$P$ Max−EIRP, where

PMax is a transmit power upper limit on the UE 1102, and EIRP is the actual EIRP of the intended Tx beam 1106.

Discussion of the relevance of the −47 dBm and the nature of the a transmit power upper limit on, for example, the intended Tx beam 1106 are analogous in this case to the cases described above.

Once the directional CCA is so performed, the base station UE 1102 acquires the channel in the direction of the intended Tx beam 1106 for a COT. In other words, the UE 1102 may limit its use of the channel attendant to this channel acquisition to the use of the intended Tx beam 1106 during the COT.

After the UE 1102 uses the directional CCA to acquire the channel in the direction of the intended Tx beam 1106 for a COT, the UE 1102 may use the COT to perform one or more transmissions to the base station 1104 according to (e.g., not exceeding) the EIRP used to calculate the CCA power threshold used to acquire the channel in the direction of the intended Tx beam 1106 for the COT.

These transmissions may include, for example, a communication of the EIRP of the intended Tx beam 1106 to a base station. Further, in some embodiments, it may be that a base station may then use the COT to transmit to the UE 1102 using an EIRP up to the EIRP received in the communication from the UE 1102. In some embodiments, any transmission by the base station 1104 will be limited to a base station Tx beam 1116 that has a similar spatial usage of the channel as the intended Tx beam 1106. For example, the base station Tx beam 1116 may be pointed towards the UE 1102, substantially in reverse of the direction of the intended Tx beam 1106. Further, the length and width of the base station Tx beam 1116 may correspond to the length and width of the intended Tx beam 1106. This limitation may restrict the base station 1104 from transmitting to another UE within its cell (unless that UE can also be communicated with using the base station Tx beam 1116).

While embodiments herein have discussed separately the use of omnidirectional CCA and directional CCA, it is anticipated that a wireless transmission system could switch between using each, as circumstance dictates. For example, a base station that needs to send a traditionally broadcast type message, such as an SSB, a system information block (SIB), a paging message, etc., may use an omnidirectional CCA in order to facilitate the sending of such a message in a broadcast fashion (without any directional limitations attendant to the use of directional CCA). The same base station may, at a different time, instead use a directional CCA in relation to unicast type messages (for example, certain scheduling messages, certain transmissions sent to and/or received from one or more UEs on a PUSCH and/or a PDSCH) in recognition of the fact that such unicast messages are amenable to the use of directional CCA.

Figure 12:
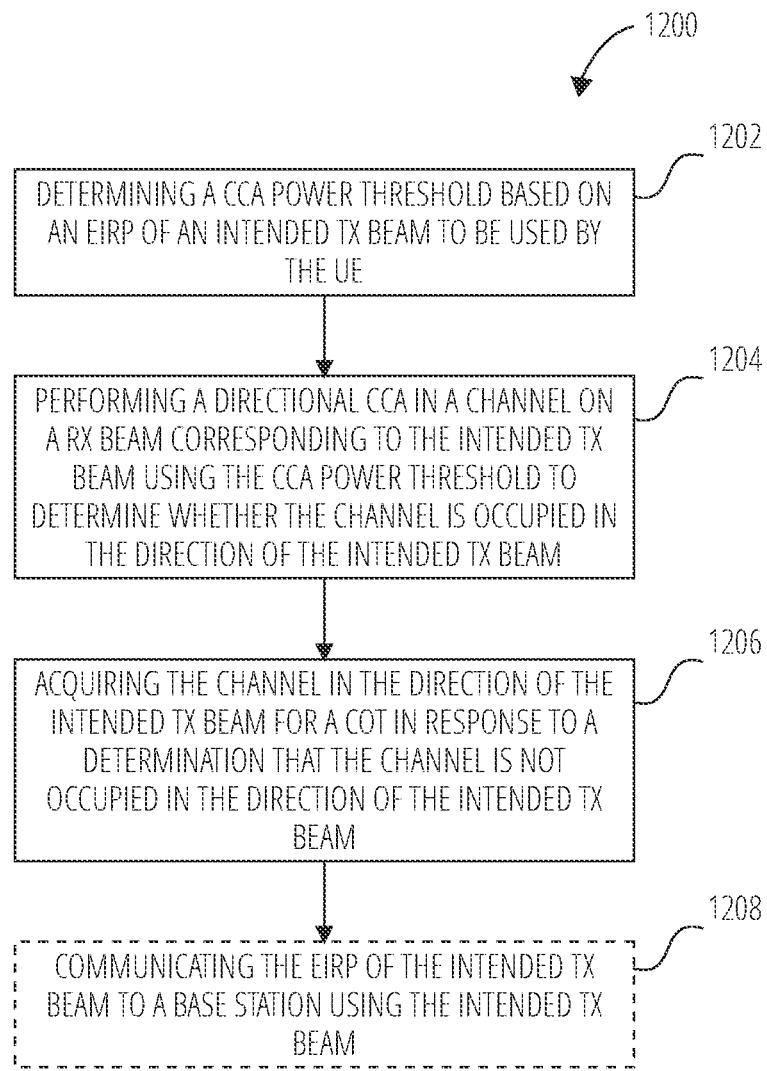
FIG. 12 illustrates a method of a UE, according to an embodiment.

FIG. 12 illustrates a method of a UE, according to an embodiment. The method 1200 includes determining 1202 a CCA power threshold based on an EIRP of an intended TX beam to be used by the UE.

The method 1200 further includes performing 1204 a directional CCA in a channel on a Rx beam corresponding to the intended Tx beam using the CCA power threshold to determine whether the channel is occupied in the direction of the intended Tx beam.

The method 1200 further includes acquiring 1206 the channel in the direction of the intended Tx beam for a COT in response to a determination that the channel is not occupied in the direction of the intended Tx beam.

The method 1200 further optionally includes communicating 1208 the EIRP of the intended Tx beam to a base station using the intended Tx beam.

In some instances, certain RATs operating in frequencies for which CCA is being used at the wireless transmission system may be understood by some devices operating according to these certain RATs to have different channel allocation bandwidths than what is normally used at the wireless transmission system (e.g., different than system bandwidths (and thus CCA bandwidths) used by the wireless transmission system). For example, IEEE 802.15.3c, WirelessHD, IEEE 802.11ad and IEEE 802.11ay may expect to see channel bandwidths of 2.16 GHz in and around the 60 GHz range, while a wireless transmission system according to NR may understand a useable channel in the 60 GHz range to be smaller. In cases where the CCA bandwidth used by the wireless transmission system in the range is narrower than channel allocation bandwidths used by other RATs in the same range, a CCA performed with the narrower CCA bandwidth may need to have its CCA power threshold further adjusted to account for the fact that the wireless transmission system detects only a portion of a (larger) channel used by these other RATs. This offset may promote fairness, in that the wireless transmission system does not over acquire its narrower channel and unfairly crowd out devices using the larger channelization corresponding to one of these other RATs. For purposes of this disclosure, an "actual CCA bandwidth" is the channel bandwidth understood/used at the wireless transmission system for the CCA process, and a "nominal CCA bandwidth" is the larger channel conceived by devices operating according to these other certain RATs.

Accordingly, it is anticipated that in some embodiments, a wireless transmission system may determine a CCA power threshold based on a scaling between an actual CCA bandwidth (BWact) and a nominal CCA bandwidth (BWnom). This may be done by calculating a scaling amount using:

$$10*\log 10(BWact/BWnom)$$

This scaling amount may then be used in the calculation of a CCA power threshold. For example, if the formula being used to calculate a CCA power threshold is:

$$-47\text{ dBm}+10*\log 10(P\max/P\text{out}), \text{ where}$$

PMax is a transmit power upper limit on the wireless transmission system; and
Pout is a transmit power useable by the wireless transmission system;
then a CCA power threshold based on the scaling between an actual CCA bandwidth and a nominal CCA bandwidth may be:

$$-47\text{ dBm}+10*\log 10(P\max/P\text{out})+10*\log 10(BWact/BWnom)\text{ dBm}.$$

By taking BWnom (the nominal CCA bandwidth) to be 2.16 GHz, Pmax (the transmit power upper limit on the wireless transmission system) equal to Pout (transmit power useable by the wireless transmission system), and by varying BWact (the actual CCA bandwidth), the effects of various actual CCA bandwidths (various BWact) can be illustrated. For example, an actual CCA bandwidth of 1.08 GHz gives:

$$-47\text{ dBm}+10*\log 10(1)+10*\log 10(1.08/2.16)$$
$$\text{dBm}\approx-50\text{ dBm}.$$

and an actual CCA bandwidth of 400 MHz gives:

$$-47\text{ dBm}+10*\log 10(1)+10*\log 10(0.400/2.16)$$
$$\text{dBm}\approx-54.3\text{ dBm}.$$

Accordingly, the use of such a scaling amount in a formula calculating a CCA power threshold may cause that the use of narrower actual CCA bandwidths to result in lower CCA power thresholds, promoting fairness to any devices using wider channels.

It is anticipated that such scaling could be performed (e.g., incorporated into) any formula used to calculate a CCA power threshold, including any formulas for determining CCA power thresholds described herein. Further, it is anticipated that such scaling could be performed by a wireless transmission system that is either of a UE or a base station. Further, it is anticipated that such scaling could be performed in relation to a CCA that is an omnidirectional CCA or a directional CCA, as described herein.

Figure 13:
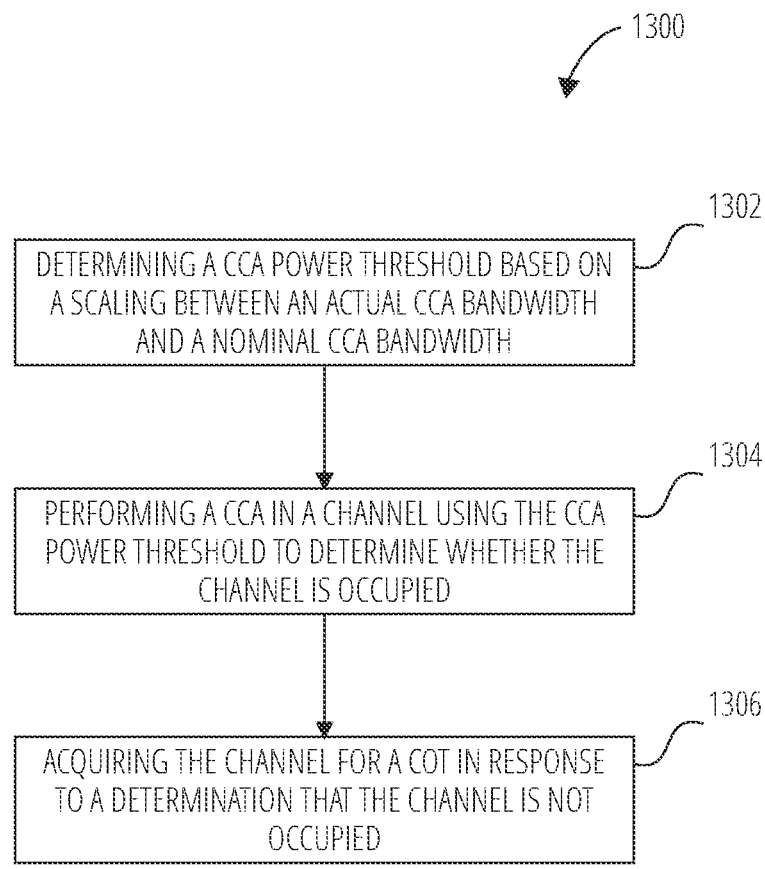
FIG. 13 illustrates a method of a wireless transmission system, according to an embodiment.

FIG. 13 illustrates a method 1300 of a wireless transmission system, according to an embodiment. The wireless transmission system may be, for example, a base station or a UE.

The method 1300 includes determining 1302 a CCA power threshold based on a scaling between an actual CCA bandwidth and a nominal CCA bandwidth.

The method 1300 further includes performing 1304 a CCA in a channel using the CCA power threshold to determine whether the channel is occupied.

The method 1300 further includes acquiring 1306 the channel for a COT in response to a determination that the channel is not occupied.

Returning briefly to FIG. 7: The use of a single intended Tx beam 706 has been illustrated in FIG. 7, it is contemplated that multiple intended Tx beams could be so used by the base station 702 to communicate with the UE 704. In this case, each intended Tx beam may have a corresponding Rx beam that is used that is used for sensing the channel during a CCA as described above, and the UE 704 may transmit to the base station 702 using multiple UE Tx beams that respectively reversely match to each intended Tx beam. In this case, a transmission described above as limited to the intended Tx beam 706 may be sent on any of the multiple intended Tx beams, and a transmission described above as limited to the UE Tx beam 716 may be sent on any of the multiple UE Tx beams.

Further, when multiple intended Tx beams are used, it may be that each intended Tx beam has a unique EIRP. It may be that the multiple respective corresponding Rx beams accordingly use separate applicable CCA power thresholds, calculated individually in the manner described above. Alternatively, the intended Tx beam with the highest EIRP of all the intended Tx beams may be used to calculate a single CCA power threshold that is use for all corresponding Rx beams.

In whatever case, in embodiments corresponding to FIG. 7 but using multiple intended Tx beams, one or more CCA times may be shared between all of the corresponding Rx beams in order to acquire a COT that allows transmissions on all related intended Tx beams, analogously to the manner as was described in relation to the two corresponding Rx beams (in different directions) that was discussed above in relation to FIG. 9 (with the number of CCA times, or the number of divisions within a single CCA time, corresponding to the number of corresponding Rx beams).

Returning briefly to FIG. 9: While the use of a single intended Tx beams 906, 914 has been illustrated in each direction in FIG. 9, it is contemplated that multiple intended Tx beams could be so used for either and/or both of the first UE 904 and/or the second UE 912 by the base station 902 to communicate respectively with each. In this case, each intended Tx beam (in whatever case) may have a corresponding Rx beam that is used for sensing the channel during a CCA as described above. Further, each of the first UE 904 and the second UE 912 may transmit to the base station 902 using multiple UE Tx beams that respectively reversely match to each intended Tx beam. In this case, a transmission described above as limited to the first intended Tx beam 906 may be sent on any of the multiple intended Tx beams to the first UE 904, and/or any transmission described above as limited to the second intended Tx beam 914 may be sent on any of the multiple intended Tx beams to the second UE 912. Further, any transmission described above as limited to the first UE Tx beam 910 may be sent on any of the multiple UE Tx beams from the first UE 904 to the base station 902, and/or any transmission described above as limited to the second UE Tx beam 918 may be sent on any of the multiple UE Tx beams from the second UE 912 to the base station 902.

Further, when more than one intended Tx beam for each of the first UE 904 and/or the second UE 912 are used, it may be that each intended Tx beam has a unique EIRP. It may be that the respective corresponding Rx beams accordingly use separate applicable CCA power thresholds, calculated individually in the manner described above. Alternatively, the intended Tx beam with the highest EIRP of all the intended Tx beams may be used to calculate a single CCA power threshold that all corresponding Rx beams use. Alternatively, the intended Tx beam with the higher EIRP of all the intended Tx beams for one of the first UE 904 and the second UE 912 may be used to calculate a single CCA power threshold that is used for all corresponding Rx beams for the respective UE.

In whatever case, in embodiments corresponding to FIG. 9 but using more than two intended Tx beams, one or more CCA times may be shared between all of the corresponding Rx beams in order to acquire a COT that allows transmissions on all related intended Tx beams, analogously to the manner as was described in relation to the two corresponding Rx beams (in different directions) that was discussed above in relation to FIG. 9 (with the number of CCA times, or the number of divisions within a single CCA time, corresponding to the number of corresponding Rx beams).

Returning briefly to FIG. 11: While the use of a single intended Tx beam 1106 has been illustrated in FIG. 11, it is contemplated that multiple intended Tx beams could be so used by the UE 1102 to communicate with the base station 1104. In this case, each intended Tx beam may have a corresponding Rx beam that is used for sensing the channel during a CCA as described above, and the base station 1104 may transmit to the UE 1102 using multiple base station Tx beams that respectively reversely match to each intended Tx beam. In this case, a transmission described above as limited to the intended Tx beam 1106 may be sent on any of the multiple intended Tx beams, and a transmission described above as limited to the base station Tx beam 1116 may be sent on any of the multiple base station Tx beams.

Further, when multiple intended Tx beams are used, it may be that each intended Tx beam has a unique EIRP. It may be that the respective corresponding Rx beams accordingly use separate applicable CCA power thresholds, calculated individually in the manner described above. Alternatively, the intended Tx beam with the highest EIRP of all the intended Tx beams may be used to calculate a single CCA power threshold that is used for all corresponding Rx beams.

In whatever case, in embodiments corresponding to FIG. 11 but using multiple intended Tx beams, one or more CCA times may be shared between all of the corresponding Rx beams in order to acquire a COT that allows transmissions on all related intended Tx beams, analogously to the manner as was described in relation to the two corresponding Rx beams (in different directions) that was discussed above in relation to FIG. 9 (with the number of CCA times, or the number of divisions within a single CCA time, corresponding to the number of corresponding Rx beams).

Figure 14:
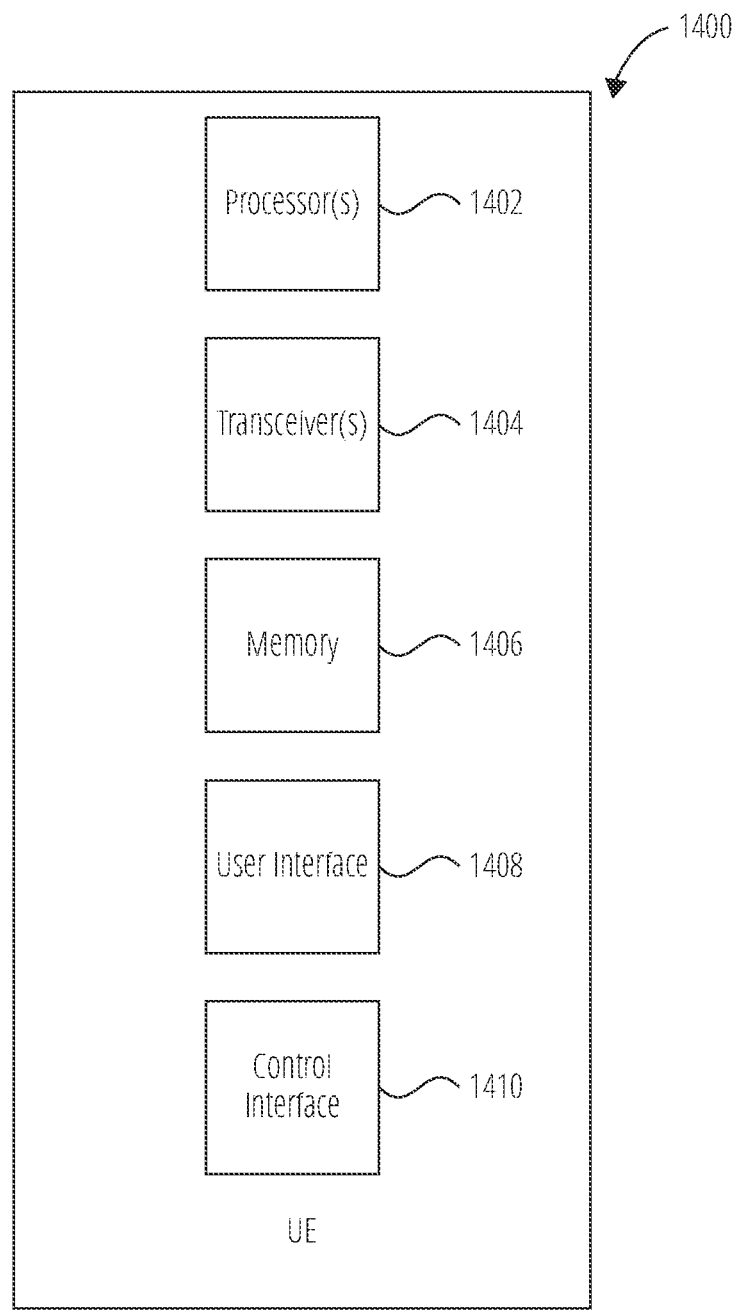
FIG. 14 illustrates a UE in accordance with one embodiment.

FIG. 14 is a block diagram of an example UE 1400 configurable according to various embodiments of the present disclosure, including by execution of instructions on a computer-readable medium that correspond to any of the example methods and/or procedures described herein. The UE 1400 comprises one or more processor 1402, transceiver 1404, memory 1406, user interface 1408, and control interface 1410.

The one or more processor 1402 may include, for example, an application processor, an audio digital signal processor, a central processing unit, and/or one or more baseband processors. Each of the one or more processor 1402 may include internal memory and/or may include interface(s) to communication with external memory (including the memory 1406). The internal or external memory can store software code, programs, and/or instructions for execution by the one or more processor 1402 to configure and/or facilitate the UE 1400 to perform various operations, including operations described herein. For example, execution of the instructions can configure the UE 1400 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1404, user interface 1408, and/or control interface 1410. As another example, the one or more processor 1402 may execute program code stored in the memory 1406 or other memory that corresponds to MAC, RLC, PDCP, and RRC layer protocols standardized by 3GPP (e.g., for NR and/or LTE). As a further example, the processor 1402 may execute program code stored in the memory 1406 or other memory that, together with the one or more transceiver 1404, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1406 may comprise memory area for the one or more processor 1402 to store variables used in protocols, configuration, control, and other functions of the UE 1400, including operations corresponding to, or comprising, any of the example methods and/or procedures described herein. Moreover, the memory 1406 may comprise non-volatile memory (e.g., flash memory), volatile memory (e.g., static or dynamic RAM), or a combination thereof.

Furthermore, the memory 1406 may interface with a memory slot by which removable memory cards in one or more formats (e.g., SD Card, Memory Stick, Compact Flash, etc.) can be inserted and removed.

The one or more transceiver 1404 may include radio-frequency transmitter and/or receiver circuitry that facilitates the UE 1400 to communicate with other equipment supporting like wireless communication standards and/or protocols. For example, the one or more transceiver 1404 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1402. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1404 includes a transmitter and a receiver that enable device 1400 to communicate with various 5G/NR networks according to various protocols and/or methods proposed for standardization by 3 GPP and/or other standards bodies. For example, such functionality can operate cooperatively with the one or more processor 1402 to implement a PHY layer based on OFDM, OFDMA, and/or SC-FDMA technologies, such as described herein with respect to other figures.

The user interface 1408 may take various forms depending on particular embodiments, or can be absent from the UE 1400. In some embodiments, the user interface 1408 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1400 may comprise a tablet computing device including a larger touchscreen display. In such embodiments, one or more of the mechanical features of the user interface 1408 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1400 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1400 having a touch screen display are capable of receiving user inputs, such as inputs related to exemplary methods and/or procedures described herein or otherwise known to persons of ordinary skill in the art.

In some exemplary embodiments of the present disclosure, the UE 1400 may include an orientation sensor, which can be used in various ways by features and functions of the UE 1400. For example, the UE 1400 can use outputs of the orientation sensor to determine when a user has changed the physical orientation of the UE 1400's touch screen display. An indication signal from the orientation sensor can be available to any application program executing on the UE 1400, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1410 may take various forms depending on particular embodiments. For example, the control interface 1410 may include an RS-232 interface, an RS-485 interface, a USB interface, an HDMI interface, a Bluetooth interface, an IEEE ("Firewire") interface, an I2C interface, a PCMCIA interface, or the like. In some exemplary embodiments of the present disclosure, control interface 1410 can comprise an IEEE 802.3 Ethernet interface such as described above. In some embodiments of the present disclosure, the control interface 1410 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1400 may include more functionality than is shown in FIG. 14 including, for example, a video and/or still-image camera, microphone, media player and/or recorder, etc. Moreover, the one or more transceiver 1404 may include circuitry for communication using additional radio-frequency communication standards including Bluetooth, GPS, and/or others. Moreover, the one or more processor 1402 may execute software code stored in the memory 1406 to control such additional functionality. For example, directional velocity and/or position estimates output from a GPS receiver can be available to any application program executing on the UE 1400, including various exemplary methods and/or computer-readable media according to various exemplary embodiments of the present disclosure.

Figure 15:
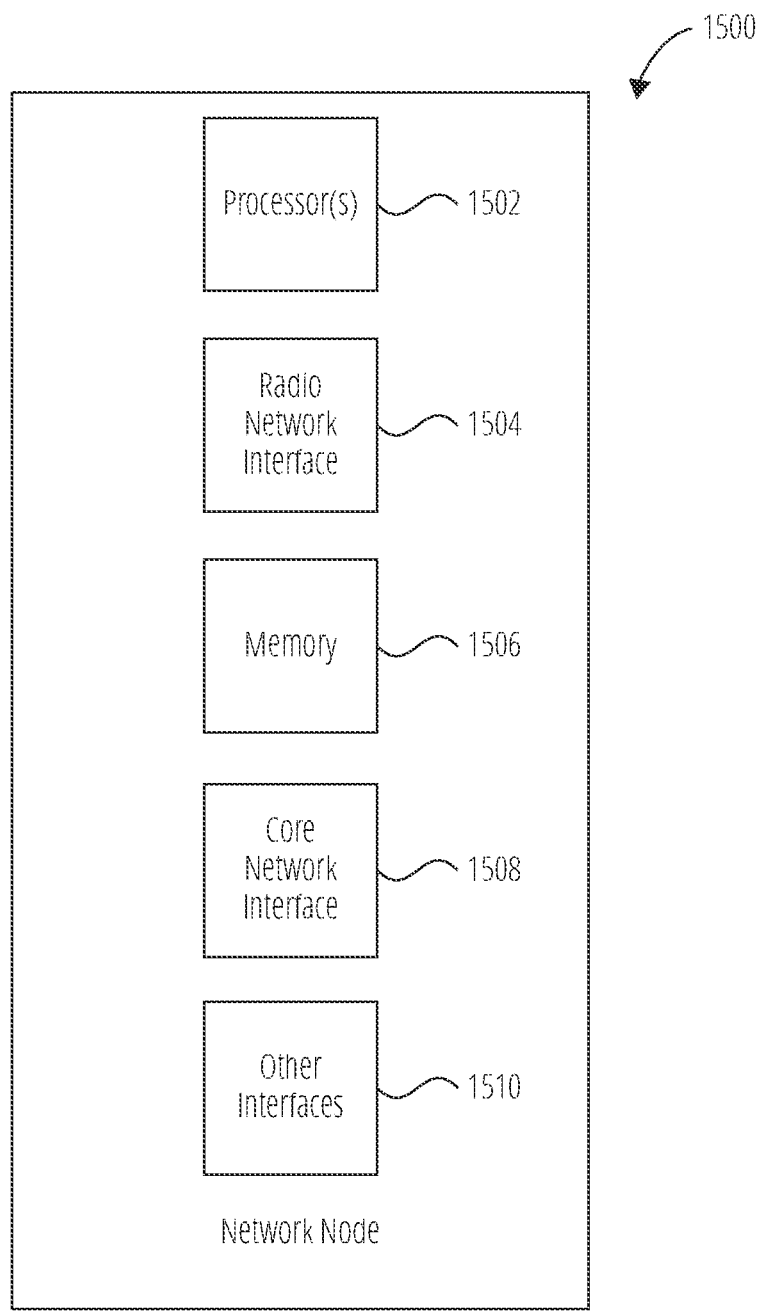
FIG. 15 illustrates a network node in accordance with one embodiment.

FIG. 15 is a block diagram of an example network node 1500 configurable according to various embodiments of the present disclosure, including by execution of instructions on a computer-readable medium that correspond to any of the example methods and/or procedures described herein.

The network node 1500 includes a one or more processor 1502, a radio network interface 1504, a memory 1506, a core network interface 1508, and other interfaces 1510. The network node 1500 may comprise, for example, a base station, eNB, gNB, access node, or component thereof.

The one or more processor 1502 may include any type of processor or processing circuitry and may be configured to perform an of the methods or procedures disclosed herein. The memory 1506 may store software code, programs, and/or instructions executed by the one or more processor 1502 to configure the network node 1500 to perform various operations, including operations described herein. For example, execution of such stored instructions can configure the network node 1500 to communicate with one or more other devices using protocols according to various embodiments of the present disclosure, including one or more methods and/or procedures discussed above. Furthermore, execution of such stored instructions can also configure and/or facilitate the network node 1500 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1504 and the core network interface 1508. By way of example and without limitation, the core network interface 1508 comprise an S1 interface and the radio network interface 1504 may comprise a Uu interface, as standardized by 3GPP. The memory 1506 may also store variables used in protocols, configuration, control, and other functions of the network node 1500. As such, the memory 1506 may comprise non-volatile memory (e.g., flash memory, hard disk, etc.), volatile memory (e.g., static or dynamic RAM), network-based (e.g., "cloud") storage, or a combination thereof.

The radio network interface 1504 may include transmitters, receivers, signal processors, ASICs, antennas, beamforming units, and other circuitry that enables network node 1500 to communicate with other equipment such as, in some embodiments, a plurality of compatible user equipment (UE). In some embodiments, the network node 1500 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1504 may include a PHY layer based on OFDM, OFDMA, and/or SC-FDMA technologies. In some embodiments, the functionality of such a PHY layer can be provided cooperatively by the radio network interface 1504 and the one or more processor 1502.

The core network interface 1508 may include transmitters, receivers, and other circuitry that enables the network node 1500 to communicate with other equipment in a core network such as, in some embodiments, circuit-switched (CS) and/or packet-switched Core (PS) networks. In some embodiments, the core network interface 1508 may include the S1 interface standardized by 3GPP. In some embodiments, the core network interface 1508 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1508 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1510 may include transmitters, receivers, and other circuitry that enables the network node 1500 to communicate with external networks, computers, databases, and the like for purposes of operations, administration, and maintenance of the network node 1500 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN–CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 16:
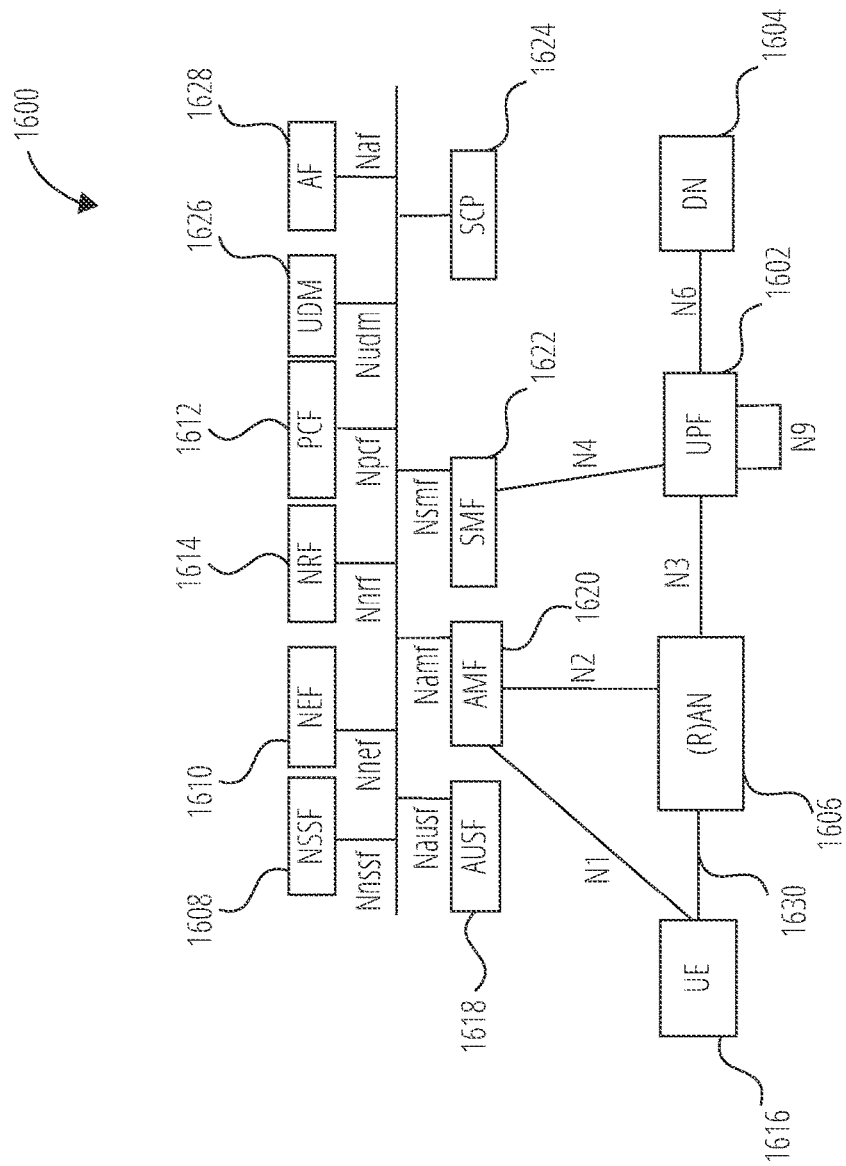
FIG. 16 illustrates an example service based architecture in accordance with certain embodiments.

FIG. 16 illustrates a service based architecture 1600 in 5GS according to one embodiment. As described in 3GPP TS 23.501, the service based architecture 1600 comprises NFs such as an NSSF 1608, a NEF 1610, an NRF 1614, a PCF 1612, a UDM 1626, an AUSF 1618, an AMF 1620, an SMF 1622, for communication with a UE 1616, a (R)AN 1606, a UPF 1602, and a DN 1604. The NFs and NF services can communicate directly, referred to as Direct Communication, or indirectly via a SCP 1624, referred to as Indirect Communication. FIG. 16 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 16 are described below.

The NSSF 1608 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1610 supports exposure of capabilities and events. NF capabilities and events may be securely exposed by the NEF 1610 (e.g., for 3rd party, Application Functions, and/or Edge Computing). The NEF 1610 may store/retrieve information as structured data using a standardized interface (Nudr) to a Unified Data Repository (UDR). The NEF 1610 may also secure provision of information from an external application to 3GPP network and may provide for the Application Functions to securely provide information to the 3GPP network (e.g., expected UE behavior, 5GLAN group information, and service specific information), wherein the NEF 1610 may authenticate and authorize and assist in throttling the Application Functions.

The NEF 1610 may provide translation of internal-external information by translating between information exchanged with the AF and information exchanged with the internal network function. For example, the NEF 1610 translates between an AF-Service-Identifier and internal 5G Core information such as DNN and S-NSSAI. The NEF 1610 may handle masking of network and user sensitive information to external AF's according to the network policy. The NEF 1610 may receive information from other network functions (based on exposed capabilities of other network functions), and stores the received information as structured data using a standardized interface to a UDR. The stored information can be accessed and re-exposed by the NEF 1610 to other network functions and Application Functions, and used for other purposes such as analytics. For external exposure of services related to specific UE(s), the NEF 1610 may reside in the HPLMN. Depending on operator agreements, the NEF 1610 in the HPLMN may have interface(s) with NF(s) in the VPLMN. When a UE is capable of switching between EPC and 5GC, an SCEF+NEF may be used for service exposure.

The NRF 1614 supports service discovery function by receiving an NF Discovery Request from an NF instance or SCP and providing the information of the discovered NF instances to the NF instance or SCP. The NRF 1614 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1612 supports a unified policy framework to govern network behavior. The PCF 1612 provides policy rules to Control Plane function(s) to enforce them. The PCF 1612 accesses subscription information relevant for policy decisions in a UDR. The PCF 1612 may access the UDR located in the same PLMN as the PCF 1612.

The UDM 1626 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1626 uses subscription data (including authentication data) that may be stored in a UDR, in which case a UDM implements the application logic and may not require an internal user data storage and several different UDMs may serve the same user in different transactions. The UDM 1626 may be located in the HPLMN of the subscribers it serves, and may access the information of the UDR located in the same PLMN.

The AUSF 1618 supports authentication for 3GPP access and untrusted non-3GPP access. The AUSF 1618 may also provide support for Network Slice-Specific Authentication and Authorization.

The AMF 1620 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1620. Regardless of the number of Network functions, in certain embodiments there is only one NAS interface instance per access network between the UE and the CN, terminated at one of the Network functions that implements at least NAS security and Mobility Management. The AMF 1620 may also include policy related functionalities.

In addition to the functionalities described above, the AMF 1620 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3TWF/TNGF; management of mobility, authentication, and separate security context state(s) of a UE connected via a non-3GPP access or connected via a 3GPP access and a non-3GPP access simultaneously; support a co-ordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1622 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1622 may include policy related functionalities.

The SCP 1624 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group TD/PCF Group TD/CHF Group ID/HSS Group ID based on UE identity (e.g., SUPI or IMPI/IMPU). Some or all of the SCP functionalities may be supported in a single instance of an SCP. In certain embodiments, the SCP 1624 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1616 may include a device with radio communication capabilities. For example, the UE 1616 may comprise a smartphone (e.g., handheld touchscreen mobile computing devices connectable to one or more cellular networks). The UE 1616 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1616 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1616 may be configured to connect or communicatively couple with the (R)AN 1606 through a radio interface 1630, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1616 and the (R)AN 1606 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 1606 to the UE 1616 and a UL transmission may be from the UE 1616 to the (R)AN 1606. The UE 1616 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1606 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1606 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1606) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1616 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1602 may act as an anchor point for intra-RAT and inter-RAT mobility, an external PDU session point of interconnect to the DN 1604, and a branching point to support multi-homed PDU session. The UPF 1602 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 1602 may include an uplink classifier to support routing traffic flows to a data network. The DN 1604 may represent various network operator services, Internet access, or third party services. The DN 1604 may include, for example, an application server.

Figure 17:
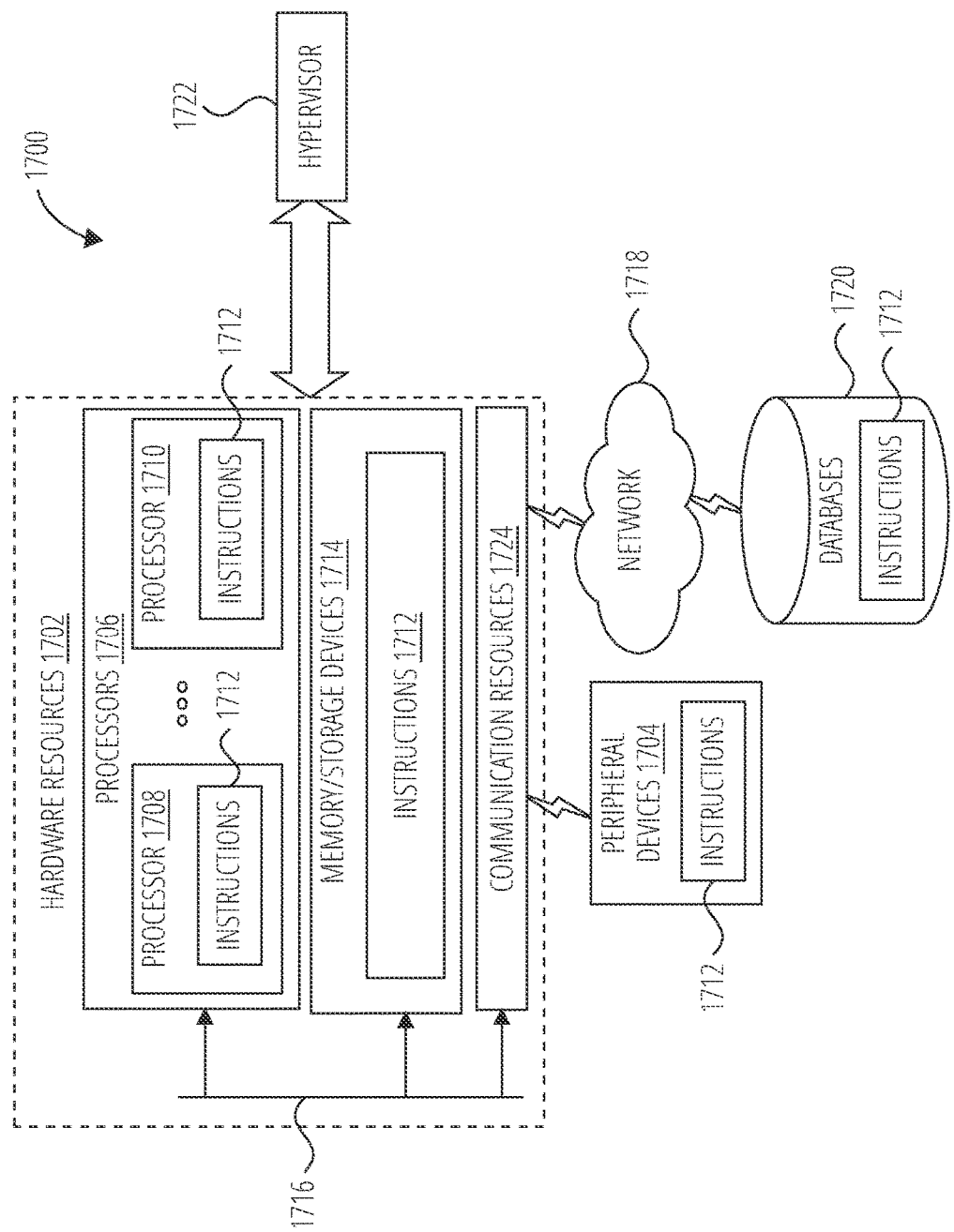
FIG. 17 illustrates components in accordance with one embodiment.

FIG. 17 is a block diagram illustrating components 1700, according to some example embodiments, able to read instructions from a machine-readable or computer-readable medium (e.g., a non-transitory machine-readable storage medium) and perform any one or more of the methodologies discussed herein. Specifically, FIG. 17 shows a diagrammatic representation of hardware resources 1702 including one or more processors 1706 (or processor cores), one or more memory/storage devices 1714, and one or more communication resources 1724, each of which may be communicatively coupled via a bus 1716. For embodiments where node virtualization (e.g., NFV) is utilized, a hypervisor 1722 may be executed to provide an execution environment for one or more network slices/sub-slices to utilize the hardware resources 1702.

The processors 1706 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1708 and a processor 1710.

The memory/storage devices 1714 may include main memory, disk storage, or any suitable combination thereof. The memory/storage devices 1714 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1724 may include interconnection or network interface components or other suitable devices to communicate with one or more peripheral devices 1704 or one or more databases 1720 via a network 1718. For example, the communication resources 1724 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1712 may comprise software, a program, an application, an applet, an app, or other executable code for causing at least any of the processors 1706 to perform any one or more of the methodologies discussed herein. The instructions 1712 may reside, completely or partially, within at least one of the processors 1706 (e.g., within the processor's cache memory), the memory/storage devices 1714, or any suitable combination thereof. Furthermore, any portion of the instructions 1712 may be transferred to the hardware resources 1702 from any combination of the peripheral devices 1704 or the databases 1720. Accordingly, the memory of the processors 1706, the memory/storage devices 1714, the peripheral devices 1704, and the databases 1720 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method of a base station, comprising: determining a clear channel assessment (CCA) power threshold using a maximum equivalent isotropic radiated power (EIRP) for the base station that is calculated based on a number of synchronization signal blocks (SSBs) transmitted by the base station per SSB burst; performing an omnidirectional CCA in a channel using the CCA power threshold to determine whether the channel is occupied; and acquiring the channel for a channel occupancy time (COT) in response to a determination that the channel is not occupied.

Example 2 is the method of Example 1, wherein the maximum EIRP for the base station is calculated by: PTrans+10*log 10(SNum) dBm, where: PTrans is a transmit power useable by the base station; and SNum is the number of SSBs transmitted by the base station per SSB burst; and wherein the CCA power threshold is calculated by: −47 dBm+PMax−EIRP, where: PMax is a transmit power upper limit on the base station, and EIRP is the maximum EIRP for the base station.

Example 3 is the method of any of Examples 1 through 2, further comprising transmitting, during the COT, a scheduling message that schedules a transmission to a user equipment (UE) on a physical downlink shared control channel (PDSCH) during the COT.

Example 4 is the method of any of Examples 1 through 3, further comprising transmitting, during the COT, a scheduling message that schedules a transmission by a user equipment (UE) on a physical uplink shared control channel (PUSCH) during the COT.

Example 5 is the method of any of Examples 1 through 3, further comprising: determining that a sum of respective EIRPs for each of one or more user equipments (UEs) is less than the maximum EIRP for the base station; and transmitting, during the COT, a scheduling message that schedules a transmission from each of the one or more of UEs on a physical uplink shared control channel (PUSCH) during the COT.

Example 6 is the method of any of Examples 1 through 5, wherein the base station is sector based, and wherein the CCA power threshold is further determined using a sector antenna gain.

Example 7 is a method of a wireless transmission system, comprising: determining a clear channel assessment (CCA) power threshold using a maximum equivalent isotropic radiated power (EIRP) for the wireless transmission system based on a number of transmit (Tx) antennas used by the wireless transmission system; performing an omnidirectional CCA in a channel using the CCA power threshold to determine whether the channel is occupied; and acquiring the channel for a channel occupancy time (COT) in response to a determination that the channel is not occupied.

Example 8 is the method of Example 7, wherein the maximum EIRP for the wireless transmission system is calculated by: PTrans+10*log 10(ANum) dBm, where: PTrans is a transmit power useable by the wireless transmission system; and ANum is the number of Tx antennas used by the wireless transmission system; and wherein the CCA power threshold is calculated by: −47 dBm+PMax−EIRP, where: PMax is a transmit power upper limit on the wireless transmission system; and where EIRP is the maximum EIRP for the wireless transmission system.

Example 9 is the method of any of Examples 7 through 8, wherein the wireless transmission system is a user equipment (UE), and further comprising communicating the maximum EIRP to a base station.

Example 10 is the method of any of Examples 7 through 8, wherein the wireless transmission system is a base station, and further comprising transmitting, during the COT, a scheduling message that schedules a transmission to a user equipment (UE) on a physical downlink shared control channel (PDSCH) during the COT.

Example 11 is the method of any of Example 7 through 8 or 10, wherein the wireless transmission system is a base station, and further comprising transmitting, during the COT, a scheduling message that schedules a transmission by a user equipment (UE) on a physical uplink shared control channel (PUSCH) during the COT.

Example 12 is the method of any of Example 7 through 8 or 10, wherein the wireless transmission system is a base station, and further comprising: determining that a sum of respective EIRPs for each of one or more of user equipments (UEs) is less than the maximum EIRP; and transmitting, during the COT, a scheduling message that schedules a transmission from each of the one or more UEs during the COT.

Example 13 is the method of any of Examples 7 through 9 or 10 through 12, wherein the wireless transmission system is a sector based base station, and wherein CCA power threshold is further determined using a sector antenna gain.

Example 14 is a method of a wireless transmission system, comprising: determining a clear channel assessment (CCA) power threshold based on an equivalent isotropic radiated power (EIRP) of an intended transmit (Tx) beam to be used by the wireless transmission system; performing a directional CCA in a channel on a receive (Rx) beam corresponding to the intended Tx beam using the CCA power threshold to determine whether the channel is occupied in the direction of the intended Tx beam; and acquiring the channel in the direction of the intended Tx beam for a channel occupancy time (COT) in response to a determination that the channel is not occupied in the direction of the intended Tx beam.

Example 15 is the method of Example 14, wherein the wireless transmission system is a user equipment (UE), and further comprising communicating the EIRP of the intended Tx beam to a base station using the intended Tx beam.

Example 16 is the method of Example 14, further comprising: determining a second CCA power threshold based on an EIRP of a second intended Tx beam to be used by the wireless transmission system; performing the directional CCA in the channel on a second Rx beam corresponding to the second intended Tx beam using the second CCA power threshold to determine whether the channel is occupied in the direction of the second Tx beam; and acquiring the channel in the direction of the second intended Tx beam for the COT in response to a determination that the channel is not occupied in the direction of the second intended Tx beam.

Example 17 is the method of Example 16, further comprising transmitting, during the COT, using the intended Tx beam, a first scheduling message to a first user equipment (UE) that schedules a first transmission to a first UE that uses the intended Tx beam on a physical downlink shared control channel (PDSCH) during the COT.

Example 18 is the method of Example 17, further comprising transmitting, during the COT, using the second intended Tx beam, a second scheduling message to a second UE that schedules a second transmission to the second UE that uses the second intended Tx beam on the PDSCH during the COT.

Example 19 is the method of Example 16, further comprising transmitting, during the COT, using the intended Tx beam, a first scheduling message to a first user equipment (UE) that schedules a transmission by a first UE on a physical uplink shared control channel (PUSCH) during the COT.

Example 20 is the method of Example 17, further comprising transmitting, during the COT, using the second intended Tx beam, a second scheduling message to a second UE that schedules a transmission by the second UE on the PUSCH during the COT.

Example 21 is the method of any of Examples 16 through 20, wherein the directional CCA is performed on the Rx beam and the second Rx beam during a single CCA time.

Example 22 is the method of any of Examples 16 through 20, wherein the directional CCA is performed on the Rx beam during a first CCA time and the directional CCA is performed on the second Rx beam during a second CCA time.

Example 23 is the method of any of Examples 16 through 20, wherein in a final slot of the directional CCA, the wireless transmission system senses the channel in an omnidirectional manner.

Example 24 is the method of any of Examples 16 through 20, wherein in a final slot of the directional CCA, the wireless transmission system senses the channel using both the Rx beam and the second Rx beam.

Example 25 is the method of Example 14, wherein the wireless transmission system is a base station.

Example 26 is a method of a wireless transmission system, comprising: determining a clear channel assessment (CCA) power threshold based on a scaling between an actual CCA bandwidth (BWact) and a nominal CCA bandwidth (BWnom); performing a CCA in a channel using the CCA power threshold to determine whether the channel is occupied; and acquiring the channel for a channel occupancy time (COT) in response to a determination that the channel is not occupied.

Example 27 is the method of Example 26, wherein the CCA power threshold is calculated by: $-47$ dBm+10*log 10(Pmax/Pout)+10*log 10(BWact/BWnom) dBm, where: PMax is a transmit power upper limit on the wireless transmission system; and Pout is a transmit power useable by the wireless transmission system.

Example 28 is the method of any of Examples 26 through 27, wherein the CCA is one of an omnidirectional CCA and a directional CCA.

Example 29 is the method of any of Examples 26 through 28, wherein the wireless transmission system is a base station.

Example 30 is the method of any of Examples 26 through 28, wherein the wireless transmission system is a user equipment (UE).

Example 31 may include an apparatus comprising means to perform one or more elements of a method described in or related to any of the above Examples, or any other method or process described herein.

Example 32 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 33 may include an apparatus comprising logic, modules, or circuitry to perform one or more elements of a method described in or related to any of the above Examples, or any other method or process described herein.

Example 34 may include a method, technique, or process as described in or related to any of the above Examples, or portions or parts thereof.

Example 35 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 36 may include a signal as described in or related to any of the above Examples, or portions or parts thereof.

Example 37 may include a datagram, packet, frame, segment, protocol data unit (PDU), or message as described in or related to any of the above Examples, or portions or parts thereof, or otherwise described in the present disclosure.

Example 38 may include a signal encoded with data as described in or related to any of the above Examples, or portions or parts thereof, or otherwise described in the present disclosure.

Example 39 may include a signal encoded with a datagram, packet, frame, segment, PDU, or message as described in or related to any of the above Examples, or portions or parts thereof, or otherwise described in the present disclosure.

Example 40 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 41 may include a computer program comprising instructions, wherein execution of the program by a processing element is to cause the processing element to carry out the method, techniques, or process as described in or related to any of the above Examples, or portions thereof.

Example 42 may include a signal in a wireless network as shown and described herein.

Example 43 may include a method of communicating in a wireless network as shown and described herein.

Example 44 may include a system for providing wireless communication as shown and described herein.

Example 45 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a base station, comprising:
   determining a clear channel assessment (CCA) power threshold using a maximum equivalent isotropic radiated power (EIRP) for the base station that is calculated based on a number of synchronization signal blocks (SSBs) transmitted by the base station per SSB burst;
   performing an omnidirectional CCA in a channel using the CCA power threshold to determine whether the channel is occupied; and
   acquiring the channel for a channel occupancy time (COT) in response to a determination that the channel is not occupied.

2. The method of claim 1, wherein the maximum EIRP for the base station is calculated by:

$$P\text{Trans}+10*\log 10(S\text{Num}) \text{ dBm, where:}$$

PTrans is a transmit power useable by the base station; and
   SNum is the number of SSBs transmitted by the base station per SSB burst; and
   wherein the CCA power threshold is calculated by:

$$-47 \text{ dBm}+P\text{Max}-\text{EIRP, where:}$$

PMax is a transmit power upper limit on the base station, and
   EIRP is the maximum EIRP for the base station.

3. The method of claim 1, further comprising transmitting, during the COT, a scheduling message that schedules a transmission to a user equipment (UE) on a physical downlink shared control channel (PDSCH) during the COT.

4. The method of claim 1, further comprising transmitting, during the COT, a scheduling message that schedules a transmission by a user equipment (UE) on a physical uplink shared control channel (PUSCH) during the COT.

5. The method of claim 1, further comprising:
   determining that a sum of respective EIRPs for each of one or more user equipments (UEs) is less than the maximum EIRP for the base station; and
   transmitting, during the COT, a scheduling message that schedules a transmission from each of the one or more of UEs on a physical uplink shared control channel (PUSCH) during the COT.

6. The method of claim 1, wherein the base station is sector based, and wherein the CCA power threshold is further determined using a sector antenna gain.

7. An apparatus for a base station, comprising:
one or more processors configured to:
  determine a clear channel assessment (CCA) power threshold using a maximum equivalent isotropic radiated power (EIRP) for the base station that is calculated based on a number of synchronization signal blocks (SSBs) transmitted by the base station per SSB burst;
  perform an omnidirectional CCA in a channel using the CCA power threshold to determine whether the channel is occupied; and
  acquire the channel for a channel occupancy time (COT) in response to a determination that the channel is not occupied.

8. The apparatus of claim 7, wherein the maximum EIRP for the base station is calculated by:

$P\text{Trans}+10*\log 10(S\text{Num})$ dBm, where:

PTrans is a transmit power useable by the base station; and
SNum is the number of SSBs transmitted by the base station per SSB burst; and
wherein the CCA power threshold is calculated by:

$-47$ dBm$+P$ Max$-$EIRP, where:

PMax is a transmit power upper limit on the base station, and
EIRP is the maximum EIRP for the base station.

9. The apparatus of claim 7, wherein the one or more processors are further configured to encode a scheduling message for the base station to transmit during the COT, wherein the scheduling message schedules a transmission to a user equipment (UE) on a physical downlink shared control channel (PDSCH) during the COT.

10. The apparatus of claim 7, wherein the one or more processors are further configured to encode a scheduling message for the base station to transmit during the COT, wherein the scheduling message schedules a transmission by a user equipment (UE) on a physical uplink shared control channel (PUSCH) during the COT.

11. The apparatus of claim 7, wherein the one or more processors are further to:
  determine that a sum of respective EIRPs for each of one or more user equipments (UEs) is less than the maximum EIRP for the base station; and
  encode a scheduling message for the base station to transmit during the COT, wherein the scheduling message schedules a transmission from each of the one or more of UEs on a physical uplink shared control channel (PUSCH) during the COT.

12. The apparatus of claim 7, wherein the base station is sector based, and wherein the CCA power threshold is further determined using a sector antenna gain.

13. A non-transitory computer-readable storage medium comprising instructions that, when executed by a processor of a base station, cause the processor to:
  determine a clear channel assessment (CCA) power threshold using a maximum equivalent isotropic radiated power (EIRP) for the base station that is calculated based on a number of synchronization signal blocks (SSBs) transmitted by the base station per SSB burst;
  perform an omnidirectional CCA in a channel using the CCA power threshold to determine whether the channel is occupied; and
  acquire the channel for a channel occupancy time (COT) in response to a determination that the channel is not occupied.

14. The non-transitory computer-readable storage medium of claim 13, wherein the maximum EIRP for the base station is calculated by:

$P\text{Trans}+10*\log 10(S\text{Num})$ dBm, where:

PTrans is a transmit power useable by the base station; and
SNum is the number of SSBs transmitted by the base station per SSB burst; and
wherein the CCA power threshold is calculated by:

$-47$ dBm$+P$ Max$-$EIRP, where:

PMax is a transmit power upper limit on the base station, and
EIRP is the maximum EIRP for the base station.

15. The non-transitory computer-readable storage medium of claim 13, wherein the instructions further cause the processor to encode a scheduling message for the base station to transmit during the COT, wherein the scheduling message schedules a transmission to a user equipment (UE) on a physical downlink shared control channel (PDSCH) during the COT.

16. The non-transitory computer-readable storage medium of claim 13, wherein the instructions further cause the processor to encode a scheduling message for the base station to transmit during the COT, wherein the scheduling message schedules a transmission by a user equipment (UE) on a physical uplink shared control channel (PUSCH) during the COT.

17. The non-transitory computer-readable storage medium of claim 13, wherein the instructions further cause the processor to:
  determine that a sum of respective EIRPs for each of one or more user equipments (UEs) is less than the maximum EIRP for the base station; and
  encode a scheduling message for the base station to transmit during the COT, wherein the scheduling message schedules a transmission from each of the one or more of UEs on a physical uplink shared control channel (PUSCH) during the COT.

18. The non-transitory computer-readable storage medium of claim 13, wherein the base station is sector based, and wherein the CCA power threshold is further determined using a sector antenna gain.

* * * * *